US008270454B2

(12) United States Patent
Sugaya

(10) Patent No.: US 8,270,454 B2
(45) Date of Patent: Sep. 18, 2012

(54) WIRELESS COMMUNICATION DEVICE, WIRELESS COMMUNICATION SYSTEM, WIRELESS COMMUNICATION METHOD AND PROGRAM

(75) Inventor: Shigeru Sugaya, Kangaawa (JP)

(73) Assignee: Sony Corporation, Tokyo (JP)

( * ) Notice: Subject to any disclaimer, the term of this patent is extended or adjusted under 35 U.S.C. 154(b) by 830 days.

(21) Appl. No.: 12/397,729

(22) Filed: Mar. 4, 2009

(65) Prior Publication Data
US 2009/0225810 A1    Sep. 10, 2009

(30) Foreign Application Priority Data
Mar. 5, 2008    (JP) ................ P2008-055256

(51) Int. Cl.
*H04B 1/00*    (2006.01)
(52) U.S. Cl. ........ 375/131; 375/260; 375/267; 375/299; 375/347; 375/349
(58) Field of Classification Search ............ 375/131, 375/260, 267, 299, 347, 349
See application file for complete search history.

(56) References Cited

U.S. PATENT DOCUMENTS

| 2005/0159106 | A1* | 7/2005 | Palin et al. ............ 455/41.2 |
| 2007/0133658 | A1* | 6/2007 | Shin et al. ............ 375/131 |
| 2007/0232244 | A1* | 10/2007 | Mo et al. ............ 455/91 |
| 2008/0130722 | A1* | 6/2008 | Choi et al. ............ 375/150 |

FOREIGN PATENT DOCUMENTS

| JP | 6-338870 | 12/1994 |
| JP | 7-212345 | 8/1995 |
| JP | 10-150386 | 6/1998 |
| JP | 2001-168771 | 6/2001 |
| JP | 2005-33414 | 2/2005 |
| JP | 2006-197375 | 8/2006 |
| JP | 2006-238233 | 9/2006 |
| JP | 2007-96425 | 4/2007 |
| JP | 2007-116543 | 5/2007 |
| JP | 2007-311909 | 11/2007 |
| JP | 2007-324729 | 12/2007 |
| JP | 2008-160845 | 7/2008 |
| JP | 2009-130530 | 6/2009 |
| JP | 2009-212957 | 9/2009 |

* cited by examiner

*Primary Examiner* — Kabir A Timory
(74) *Attorney, Agent, or Firm* — Finnegan, Henderson, Farabow, Garrett & Dunner, L.L.P.

(57) ABSTRACT

A wireless communication device includes: a first transmission portion that transmits a radio signal using a plurality of frequency bands in accordance with a first frequency hopping pattern; a second transmission portion that transmits a radio signal using a plurality of frequency bands in accordance with a second frequency hopping pattern that differs from the first frequency hopping pattern; and an adjustment portion that adjusts a start timing of the second frequency hopping pattern such that a time slot of each of the plurality of frequency bands used by the first transmission portion and a time slot of each of the plurality of frequency bands used by the second transmission portion are not the same.

13 Claims, 32 Drawing Sheets

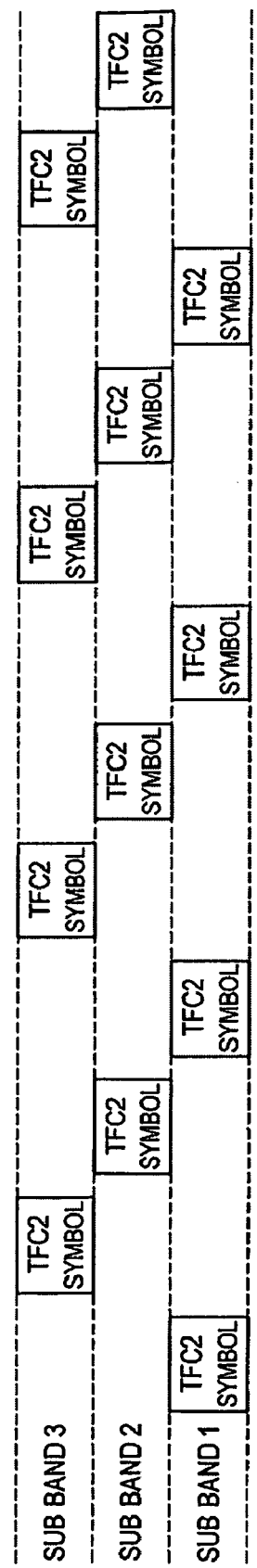

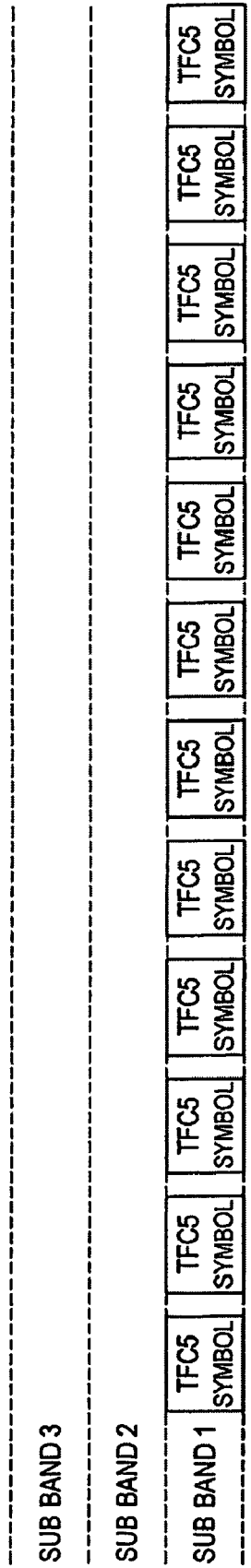

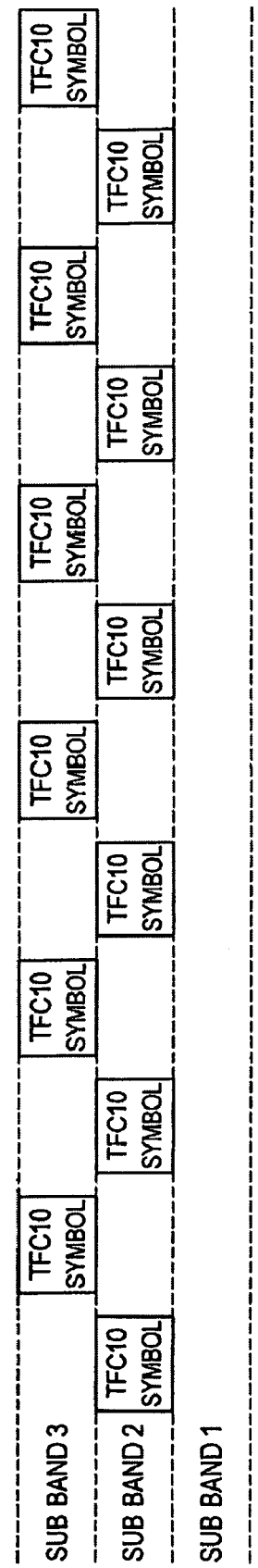

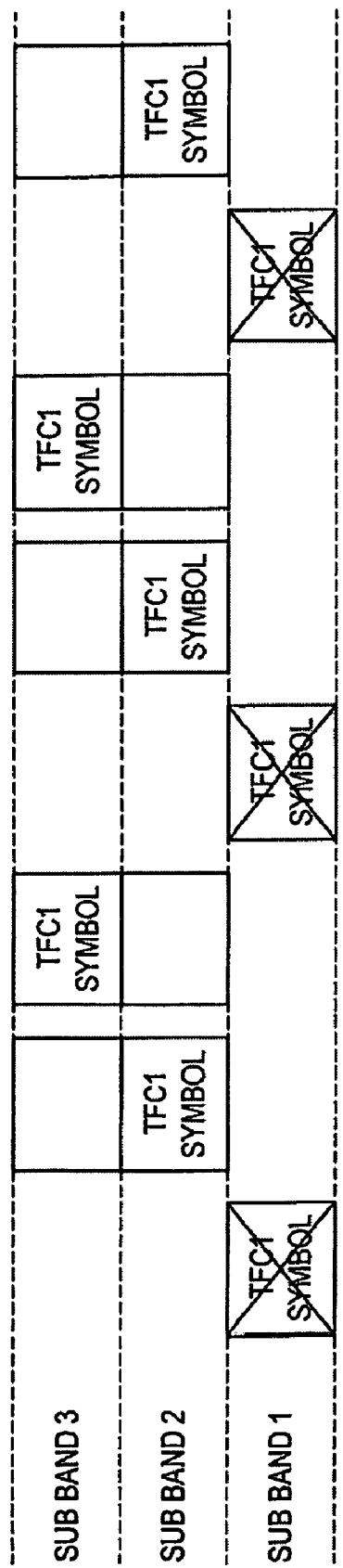

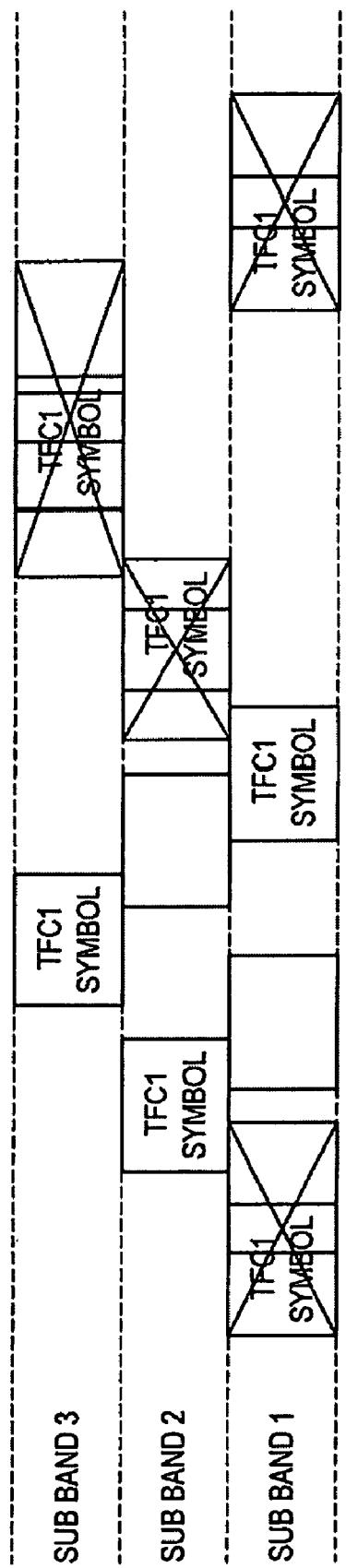

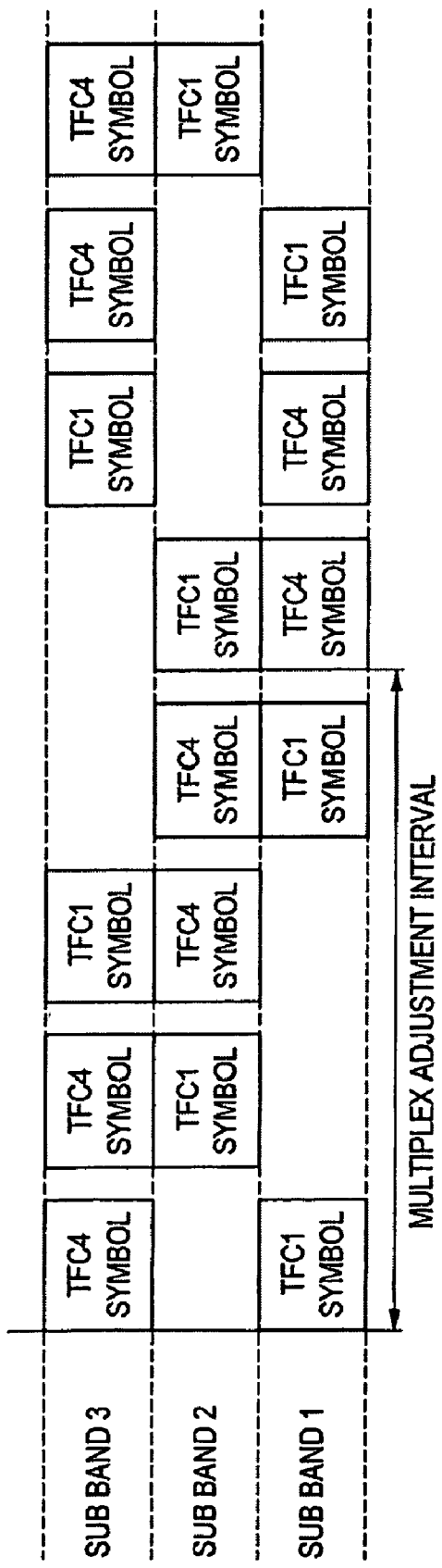

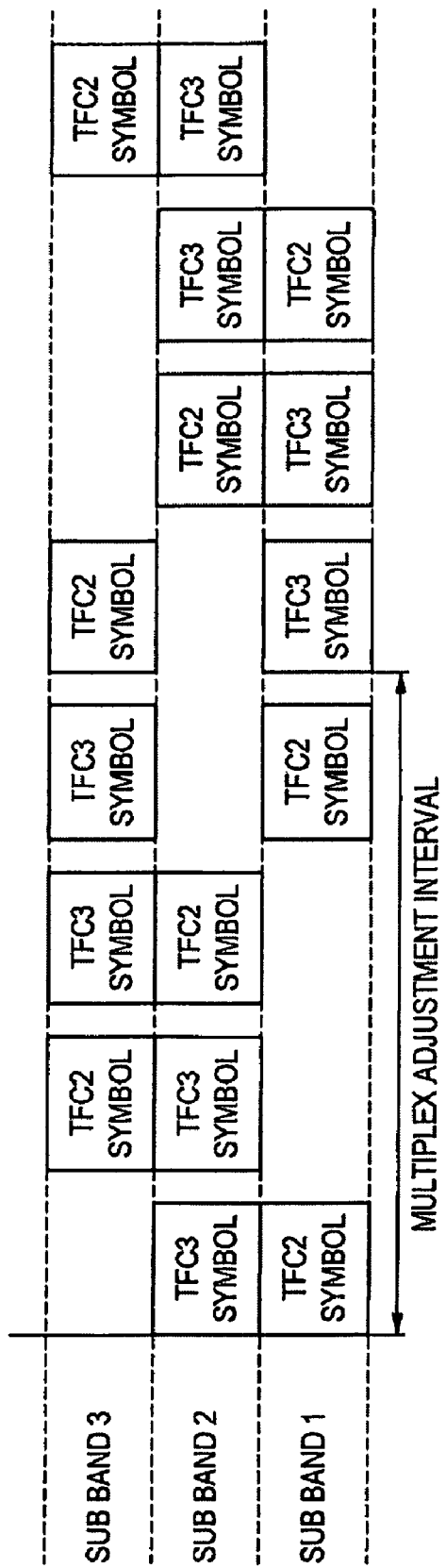

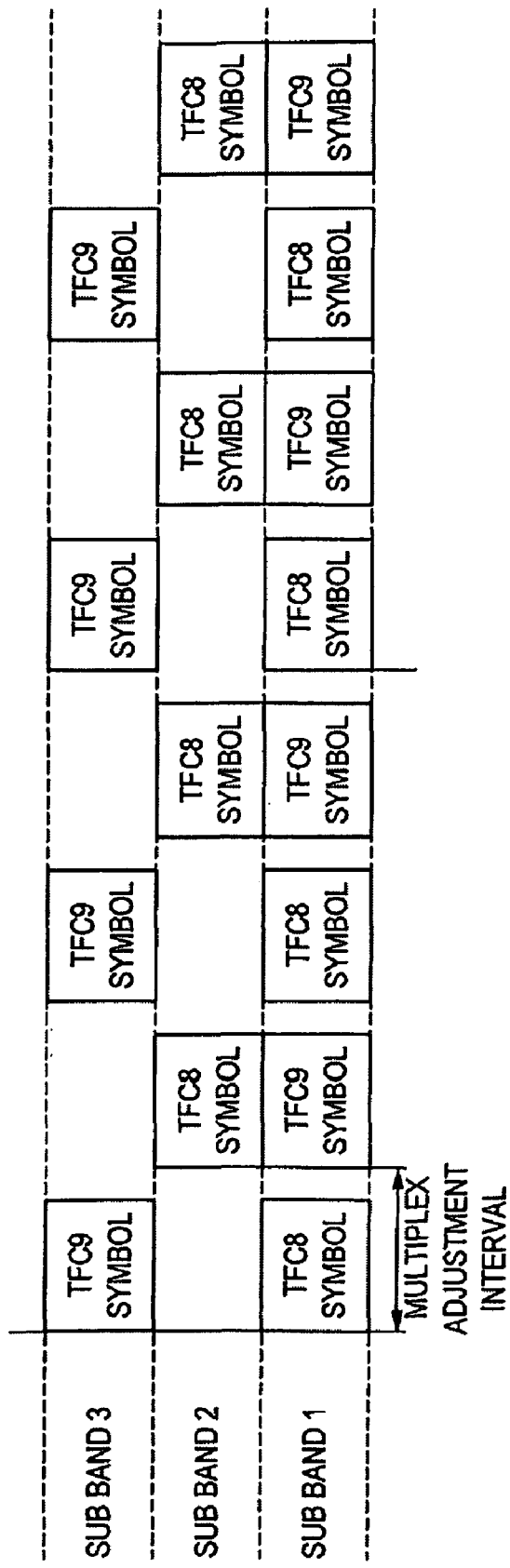

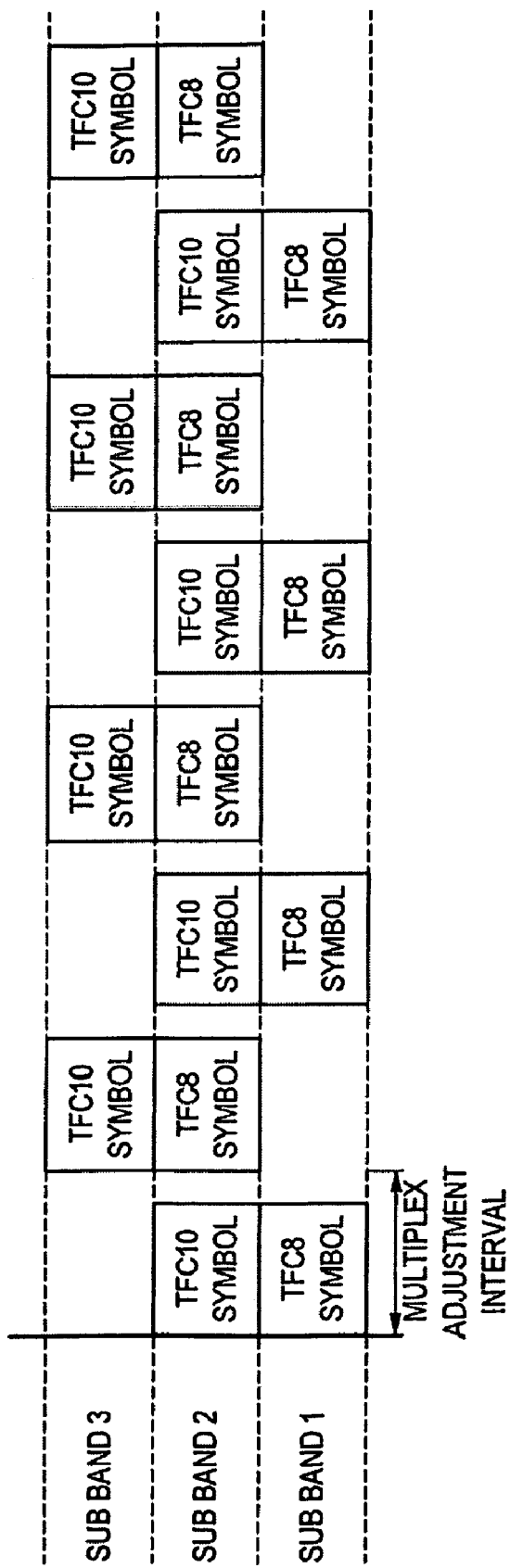

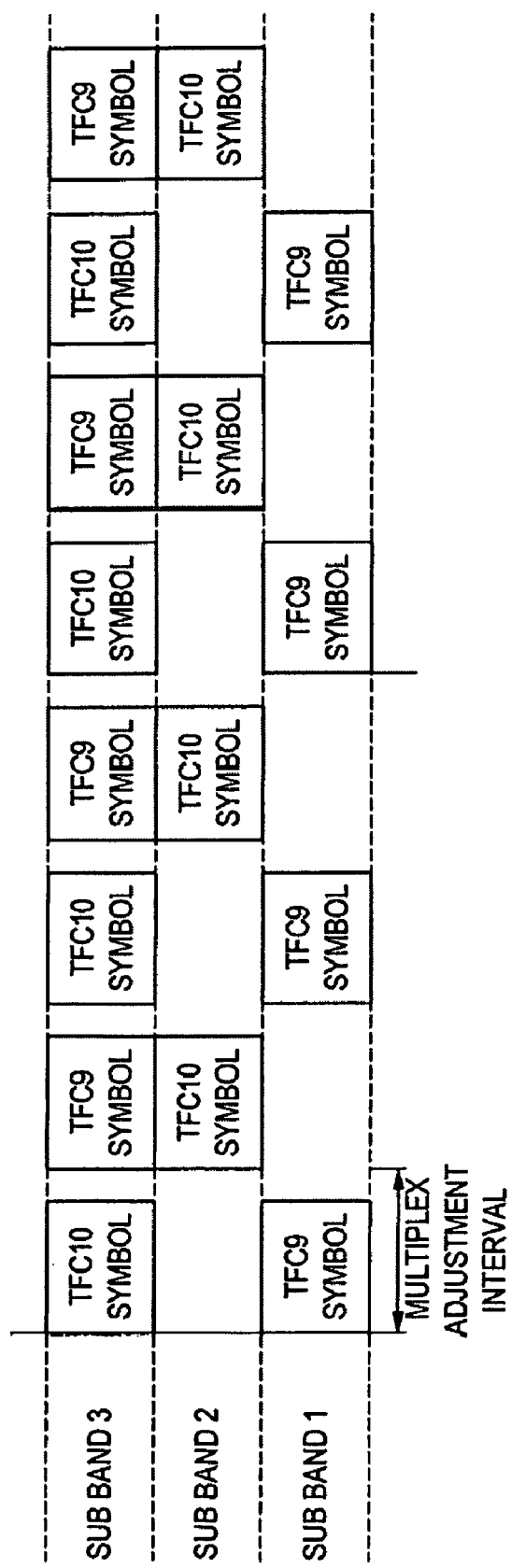

FIG.9D

| 1 Octet | 1 Octet | 2 Octets | 2 Octets | 4 Octets | ... | 4 Octets |
|---|---|---|---|---|---|---|
| ELEMENT IDENTIFIER | INFORMATION LENGTH | DRP RESERVATION CONTROL INFORMATION | TARGET/OWNER DEVICE ADDRESS | DRP ALLOCATION 1 | ... | DRP ALLOCATION N |
| 61 | 62 | 63 | 64 | 65 | | 66 |

| 1 Octet | 1 Octet | 1 Octet | 1 Octet | 2 Octets |
|---|---|---|---|---|
| ELEMENT IDENTIFIER | INFORMATION LENGTH | BEACON PERIOD MOVE COUNT DOWN | BEACON SLOT POSITION | BPST START POSITION |
| 71 | 72 | 73 | 74 | 75 |

| 1 Octet | 1 Octet | 1 Octet | 1 Octet | 2 Octets | 2 Octets |
|---|---|---|---|---|---|
| ELEMENT IDENTIFIER | INFORMATION LENGTH | FIRST TFC CODE | SECOND TFC CODE | BPST START POSITION | AVAILABLE TFC BITMAP |
| 81 | 82 | 83 | 84 | 85 | 86 |

43

FIG.11A
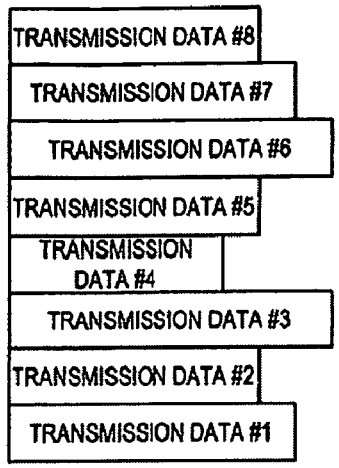
FIG.11B
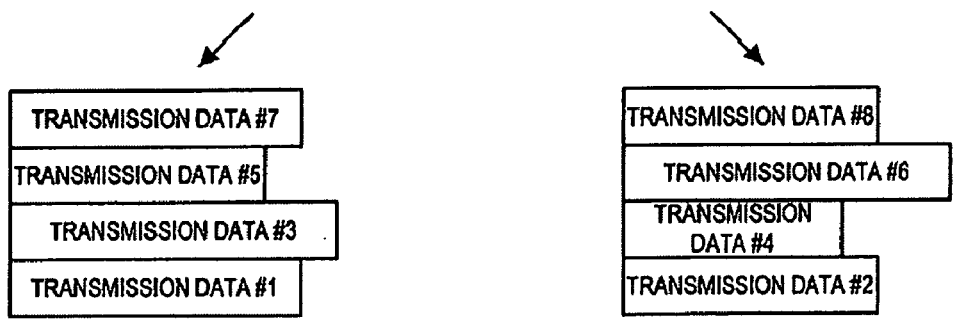
FIG.11C
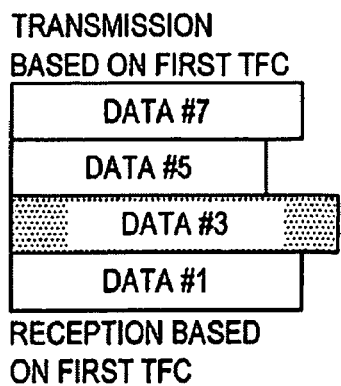
TRANSMISSION
BASED ON FIRST TFC
RECEPTION BASED
ON FIRST TFC
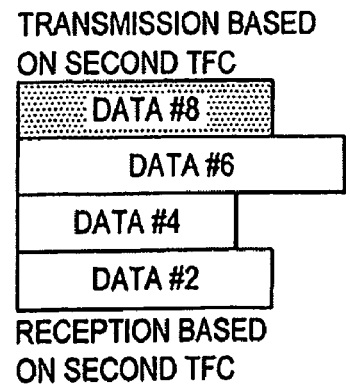
TRANSMISSION BASED
ON SECOND TFC
RECEPTION BASED
ON SECOND TFC

RE-TRANSMISSION
BASED ON FIRST TFC

| DATA #8 |

RECEPTION BASED
ON FIRST TFC

RE-TRANSMISSION
BASED ON SECOND TFC

| DATA #3 |

RECEPTION BASED
ON SECOND TFC

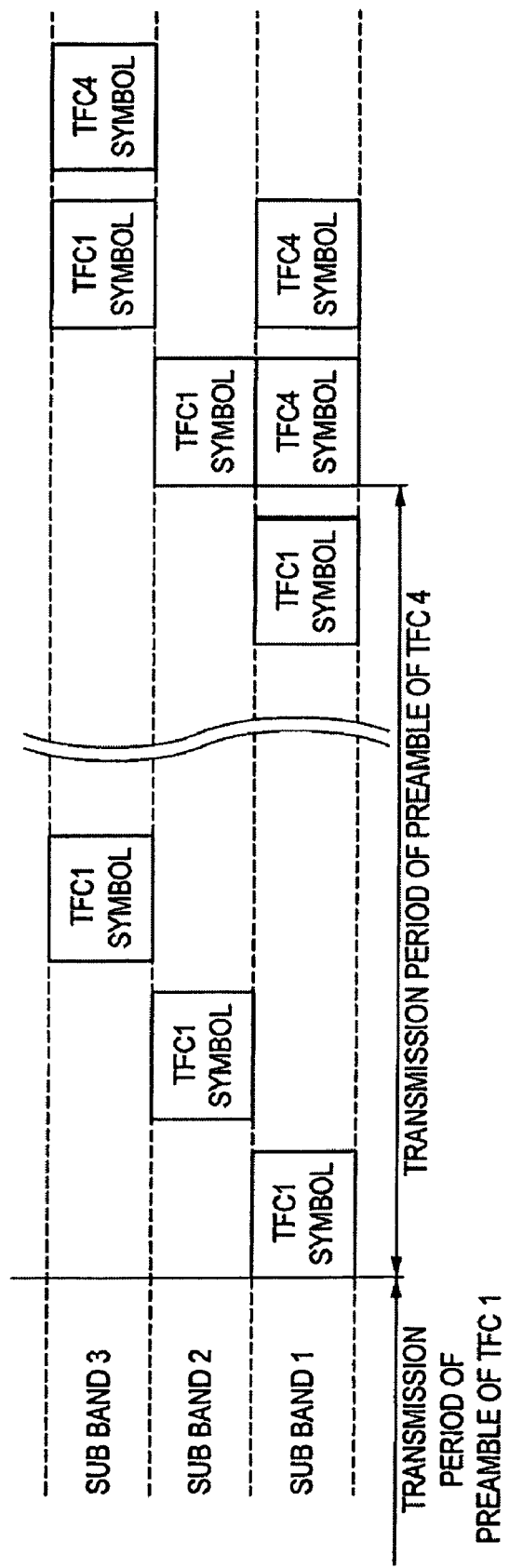

WIRELESS COMMUNICATION DEVICE, WIRELESS COMMUNICATION SYSTEM, WIRELESS COMMUNICATION METHOD AND PROGRAM

CROSS REFERENCES TO RELATED APPLICATIONS

The present invention contains subject matter related to Japanese Patent Application JP 2008-055256 filed in the Japan Patent Office on Mar. 5, 2008, the entire contents of which being incorporated herein by reference.

BACKGROUND OF THE INVENTION

1. Field of the Invention

The present invention relates to a wireless communication device, a wireless communication system, a wireless communication method, and a program.

2. Description of the Related Art

In a known multi band orthogonal frequency division multiplexing (OFDM) system, a wireless communication method is defined in which a plurality of frequency bands are sequentially used according to a certain frequency hopping pattern. Further, a plurality of frequency hopping patterns are defined in the multi band OFDM system. It has been suggested that a plurality of wireless communication devices can coexist by using different frequency hopping patterns selected from the defined plurality of frequency hopping patterns.

For example, Japanese Patent Application Publication No. JP-A-2007-96425 describes a communication method in which data is transmitted/received between a transmission source device and a receiving destination device that use different frequency hopping patterns. Also, JP-A-2007-96425 describes that this communication method improves response performance of data transmission/reception.

SUMMARY OF THE INVENTION

The known communication method can increase the total amount of data transmission between the transmission source device and the receiving destination device. However, the transmission bandwidth from the transmission source device to the receiving destination device cannot be increased.

The present invention addresses the problem described above and provides a wireless communication device, a wireless communication system, a wireless communication method, and a program that are new and improved and that are capable of increasing transmission bandwidth in one direction.

According to an embodiment of the present invention, there is provided a wireless communication device that includes: a first transmission portion that transmits a radio signal using a plurality of frequency bands in accordance with a first frequency hopping pattern; a second transmission portion that transmits a radio signal using a plurality of frequency bands in accordance with a second frequency hopping pattern that differs from the first frequency hopping pattern; and an adjustment portion that adjusts a start timing of the second frequency hopping pattern such that a time slot of each of the plurality of frequency bands used by the first transmission portion and a time slot of each of the plurality of frequency bands used by the second transmission portion are not the same.

With this configuration, the first transmission portion and the second transmission portion transmit radio signals in parallel. Accordingly, the wireless communication device can obtain a larger transmission band than in the case of transmitting radio signals only from one transmission portion. Further, the adjustment portion adjusts the start timing of the second frequency hopping pattern used by the second transmission portion such that the time slot of each of the frequency bands used by the first transmission portion and the time slot of each of the frequency bands used by the second transmission portion are not the same. Accordingly, it is possible to suppress interference between the radio signal transmitted from the first transmission portion and the radio signal transmitted from the second transmission portion. In summary, the wireless communication device can increase the transmission bandwidth while suppressing interference between two types of radio signals.

The first transmission portion may start transmission of a radio signal in accordance with the first frequency hopping pattern after transmitting a first preamble, and the second transmission portion may start transmission of a radio signal in accordance with the second frequency hopping pattern after transmitting a second preamble. The adjustment portion may perform adjustment such that the transmission of the second preamble from the second transmission portion is started after completion of the transmission of the first preamble from the first transmission portion. With this configuration, the first preamble and the second preamble are transmitted in different time slots. Thus, interference between the first preamble and the second preamble can be inhibited. Accordingly, synchronization with the first preamble and with the second preamble can be more reliably achieved at a receiving destination device.

The first transmission portion may transmit a beacon in accordance with the first frequency hopping pattern in a first beacon period of a first wireless network that operates on the first frequency hopping pattern. The second transmission portion may transmit a beacon in accordance with the second frequency hopping pattern in a second beacon period of a second wireless network that operates on the second frequency hopping pattern.

The wireless communication device may further include: a first beacon generation portion that generates a beacon including information that inhibits transmission of a radio signal in the second beacon period; and a second beacon generation portion that generates a beacon including information that inhibits transmission of a radio signal in the first beacon period. Further, the first transmission portion may transmit the beacon generated by the first beacon generation portion, and the second transmission portion may transmit the beacon generated by the second beacon generation portion. With this configuration, transmission of a radio signal in the second beacon period from a wireless communication device included in the first wireless network is inhibited based on the beacon transmitted from the first transmission portion. Thus, the second beacon period of the second wireless network can be protected. Further, transmission of a radio signal in the first beacon period from a wireless communication device included in the second wireless network is inhibited based on the beacon transmitted from the second transmission portion. Thus, the first beacon period of the first wireless network can be protected.

The first beacon generation portion and the second beacon generation portion may generate beacons including information that respectively indicates the first frequency hopping pattern and the second frequency hopping pattern. With this configuration, the receiving destination device can confirm in advance that the counterpart wireless communication device can use the first frequency hopping pattern and the second frequency hopping pattern in a multiplexed manner.

The wireless communication device may further include: a transmission buffer that temporarily stores transmission data to be transmitted from the first transmission portion as a radio signal; and a determination portion that causes also the second transmission portion to transmit a radio signal when a data amount of the transmission data stored in the transmission buffer exceeds a predetermined value. Further, the determination portion may stop the transmission of a radio signal from the second transmission portion when the data amount of the transmission data stored in the transmission buffer becomes equal to or less than the predetermined value. With this configuration, when the data amount of the transmission data stored in the transmission buffer exceeds the predetermined value, the transmission bandwidth of the wireless communication device is increased. Accordingly, even when the data amount of the transmission data stored in the transmission buffer exceeds the predetermined value, the transmission data can be transmitted rapidly.

The wireless communication device may further include an allocation portion that allocates the transmission data stored in the transmission buffer to the first transmission portion and the second transmission portion. When the transmission data transmitted as a radio signal from one of the first transmission portion and the second transmission portion is not received properly by a receiving destination device, the allocation portion may allocate the transmission data to the other transmission portion for retransmission. With this configuration, the transmission data that has not been transmitted successfully is retransmitted using a different method. Thus, it is possible to prevent errors occurring again when transmitting the transmission data.

The wireless communication device may further include: a storage portion that associates and records a combination of two or more of frequency hopping patterns and an adjustment amount; and a setting portion that sets the combination of the frequency hopping patterns recorded in the storage portion as a combination of frequency hopping patterns used by the first transmission portion and the second transmission portion. Further, the adjustment portion may adjust the start timing of the second frequency hopping pattern based on the adjustment amount that is associated with the combination of the frequency hopping patterns and recorded in the storage portion. Moreover, the first transmission portion and the second transmission portion may transmit beacons at the same timing.

According to another embodiment of the present invention, there is provided a wireless communication system including a first wireless communication device and a second wireless communication device that is capable of communicating with the first wireless communication device. More specifically, the first wireless communication device includes: a first transmission portion that transmits a radio signal using a plurality of frequency bands in accordance with a first frequency hopping pattern; a second transmission portion that transmits a radio signal using a plurality of frequency bands in accordance with a second frequency hopping pattern that differs from the first frequency hopping pattern; and an adjustment portion that adjusts a start timing of the second frequency hopping pattern such that a time slot of each of the plurality of frequency bands used by the first transmission portion and a time slot of each of the plurality of frequency bands used by the second transmission portion are not the same. Further, the second wireless communication device includes: a first receiving portion that receives a radio signal that is transmitted using a plurality of frequency bands in accordance with the first frequency hopping pattern; and a second receiving portion that receives a radio signal that is transmitted using a plurality of frequency bands in accordance with the second frequency hopping pattern.

According to another embodiment of the present invention, there is provided a wireless communication method that includes the steps of: transmitting a radio signal using a plurality of frequency bands in accordance with a first frequency hopping pattern; and transmitting a radio signal using a plurality of frequency bands in accordance with a second frequency hopping pattern that differs from the first frequency hopping pattern. A start timing of the second frequency hopping pattern is adjusted such that a time slot of each of the plurality of frequency bands used by the first frequency hopping pattern and a time slot of each of the plurality of frequency bands used by the second frequency hopping pattern are not the same.

According to another embodiment of the present invention, there is provided a program that includes instructions for a computer, provided in a wireless communication device that includes: a first transmission portion that transmits a radio signal using a plurality of frequency bands in accordance with a first frequency hopping pattern; and a second transmission portion that transmits a radio signal using a plurality of frequency bands in accordance with a second frequency hopping pattern that differs from the first frequency hopping pattern. The instructions command the computer to function as: an adjustment portion that adjusts a start timing of the second frequency hopping pattern such that a time slot of each of the plurality of frequency bands used by the first transmission portion and a time slot of each of the plurality of frequency bands used by the second transmission portion are not the same.

This program can cause a hardware resource of a computer including a CPU, a ROM, a RAM or the like to perform the function of the above-described adjustment portion. In other words, it is possible to cause a computer that uses this program to function as the above-described adjustment portion.

According to the embodiments of the present invention described above, transmission bandwidth can be increased in one direction.

BRIEF DESCRIPTION OF THE DRAWINGS

FIG. 5B is an explanatory diagram showing a frequency hopping pattern of TFC 2;

FIG. 5E is an explanatory diagram showing a frequency hopping pattern of TFC 5;

FIG. 5J is an explanatory diagram showing a frequency hopping pattern of TFC 10;

FIG. 6A is an explanatory diagram showing problem points when one wireless communication device transmits radio signals in a multiplexed manner using different frequency hopping patterns;

FIG. 6C is an explanatory diagram showing problem points when one wireless communication device transmits radio signals in a multiplexed manner using different frequency hopping patterns;

FIG. 7A is an explanatory diagram showing a manner in which radio signals are multiplexed using frequency hopping patterns defined by TFC 1 and TFC 4;

FIG. 7B is an explanatory diagram showing a manner in which radio signals are multiplexed using frequency hopping patterns defined by TFC 2 and TFC 3;

FIG. 7C is an explanatory diagram showing a manner in which radio signals are multiplexed using frequency hopping patterns defined by TFC 8 and TFC 9;

FIG. 7D is an explanatory diagram showing a manner in which radio signals are multiplexed using frequency hopping patterns defined by TFC 8 and TFC 10;

FIG. 7E is an explanatory diagram showing a manner in which radio signals are multiplexed using frequency hopping patterns defined by TFC 9 and TFC 10;

FIG. 9D is an explanatory diagram showing an example of the structure of a DRP reservation information element;

FIG. 9E is an explanatory diagram showing an example of the structure of a beacon period switch information element;

FIG. 9F is an explanatory diagram showing an example of the structure of a TFC multiplex information element;

FIG. 11A is an explanatory diagram illustrating functions of a distributed processing portion and an aggregation processing portion;

FIG. 11B is an explanatory diagram illustrating functions of the distributed processing portion and the aggregation processing portion;

FIG. 11C is an explanatory diagram illustrating functions of the distributed processing portion and the aggregation processing portion;

FIG. 12 is an explanatory diagram showing transmission periods of respective preambles corresponding to each radio signal;

DETAILED DESCRIPTION OF THE PREFERRED EMBODIMENTS

Figure 1:
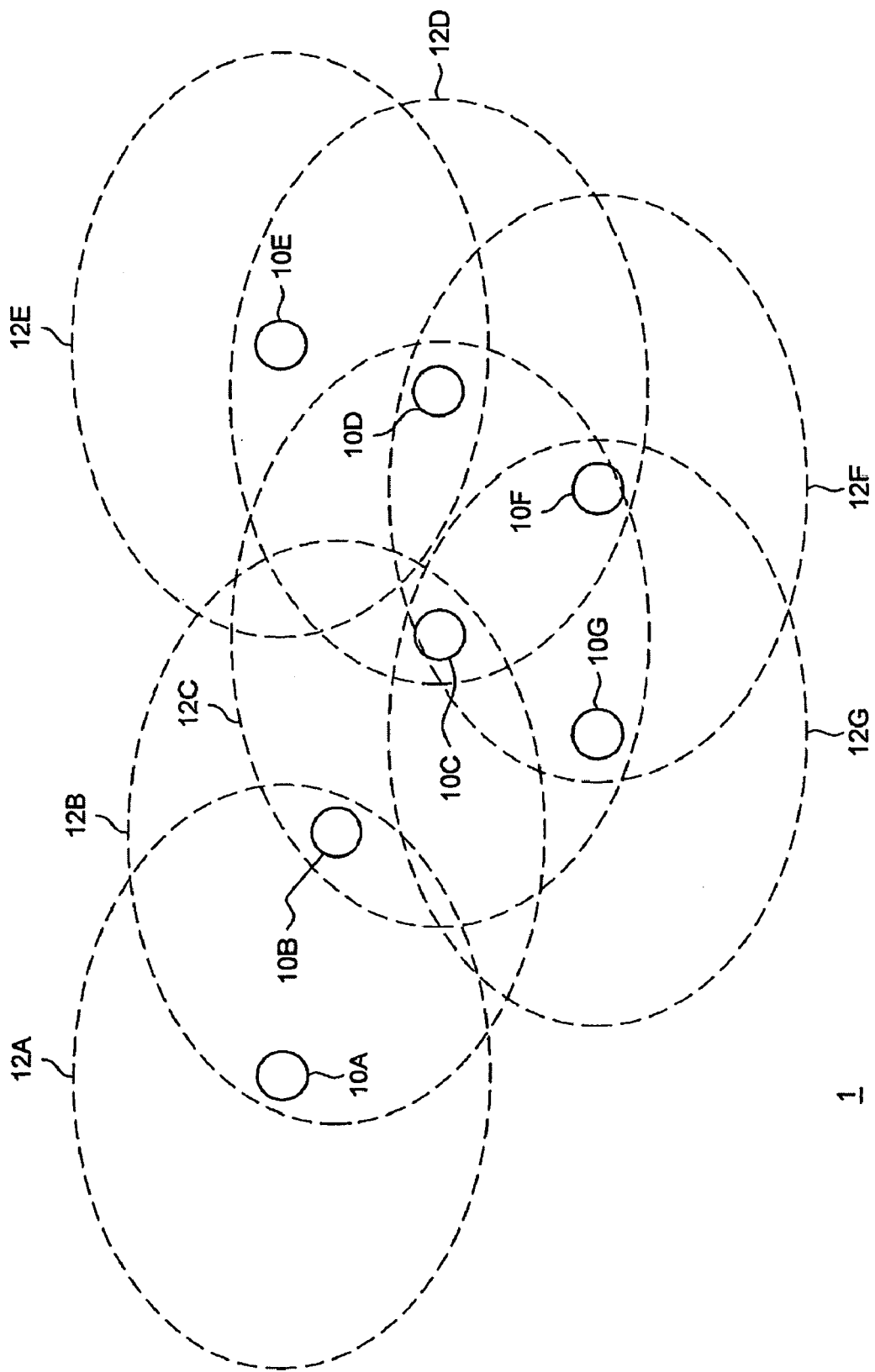
FIG. 1 is an explanatory diagram showing an example of the configuration of a wireless communication system according to the present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiment for practicing the present invention will be described in the order shown below.

1. Overview of wireless communication system according to the present embodiment
 1-1. Example of the configuration of the wireless communication system
 1-2. Time sharing control
 1-3. TFC code
2. Background of the present embodiment
3. Detailed description of the present embodiment
 3-1. Outline of wireless communication according to the present embodiment
 3-2. Configuration of wireless communication device according to the present embodiment
 3-3. Operation of the wireless communication device according to the present embodiment
4. Conclusion

1. OVERVIEW OF WIRELESS COMMUNICATION SYSTEM ACCORDING TO THE PRESENT EMBODIMENT

1-1. Example of the Configuration of the Wireless Communication System

First, an example of the configuration of a wireless communication system 1 according to the present invention will be described with reference to FIG. 1.

FIG. 1 is an explanatory diagram showing an example of the configuration of the wireless communication system 1 according to the present embodiment. Circles in FIG. 1 show wireless communication devices 10A to 10G. Areas denoted by dotted lines show radio wave reachable ranges 12A to 12G in which the respective wireless communication devices 10A to 10G can perform communication.

More specifically, the wireless communication device 10A can communicate with the wireless communication device 10B that is included in the radio wave reachable range 12A of the wireless communication device 10A. The wireless communication device 10B can communicate with the wireless communication devices 10A and 10C that are included in the radio wave reachable range 12B of the wireless communication device 10B. Similarly, the wireless communication device 10C can communicate with the wireless communication devices 10B, 10D, 10F and 10G. The wireless communication device 10D can communicate with the wireless communication devices 10C, 10E and 10F. The wireless communication device 10E can communicate with the wireless communication device 10D.

Further, the wireless communication device 10F can communicate with the wireless communication devices 10C, 10D and 10G that are included in the radio wave reachable range 12F of the wireless communication device 10F. Similarly, the wireless communication device 10G can communicate with the wireless communication devices 10C and 10F.

The above-described wireless communication devices 10A to 10G transmit and receive beacons, which are an example of communication management information, at a predetermined cycle, and form an autonomous distributed wireless network (an ad hoc network). Thus, the wireless communication devices 10A to 10G that form the wireless network can transmit and receive various types of data. The various types of data may include audio data such as music, a lecture, a radio program, or the like, visual data such as a motion picture, a television program, a video program, a photograph, a document, a painting, a diagram, or the like, and any other type of data, such as a game, software, or the like.

Note that, in the description hereinafter, when it is not necessary to specifically distinguish between the wireless communication devices 10A to 10G, the term wireless communication devices 10 alone will be used. Further, when it is not necessary to specifically distinguish between the radio wave reachable ranges 12A to 12G, the term radio wave reachable ranges 12 will be used. Further, FIG. 1 shows the wireless communication system 1 and also shows the wireless network. Therefore, it can be understood that the terms wireless communication system 1 and wireless network can be almost synonymously used. However, generally, the term network indicates a structure including links in addition to nodes (wireless communication devices). Accordingly, it can also be understood that the wireless network is different from the wireless communication system 1 in that the wireless network includes links in addition to the wireless communication devices 10A to 10G.

Each of the wireless communication devices 10 may be any information processing device such as a personal computer (PC), a household image processing device (a DVD recorder, a video deck or the like), a mobile phone, a personal handyphone system (PHS), a mobile music playback device, a mobile image processing device, a personal digital assistant (PDA), a household game console, a mobile game machine, a household appliance, or the like.

1-2. Time Sharing Control

One example of the configuration of the autonomous distributed wireless communication system 1 is described above. Then, a super frame for time sharing control in the wireless communication system 1 will be described with reference to FIG. 2.

Figure 2:
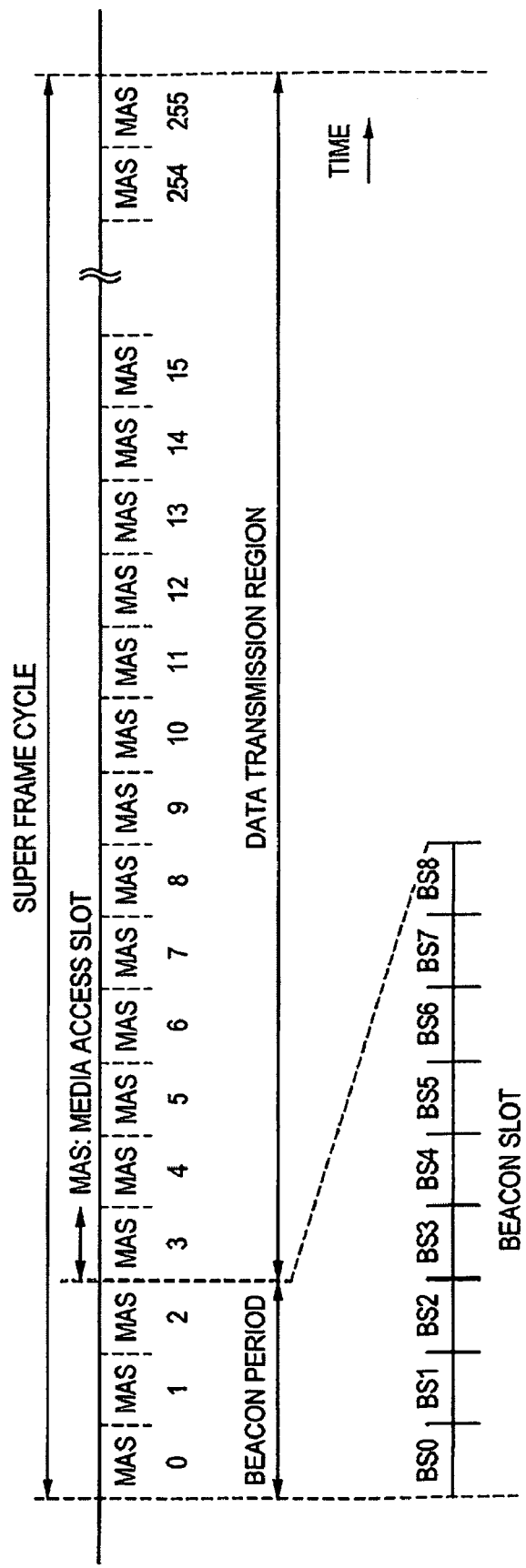
FIG. 2 is an explanatory diagram showing an example of the structure of a super frame.

FIG. 2 is an explanatory diagram showing an example of the structure of a super frame The super frame cycle is defined by a predetermined time (for example, 65 ms), and is divided into 256 media access slots (MAS). The wireless communication devices 10 that form one wireless network share the super frame cycle as a specified period frame, and the divided MAS are used as units to transfer messages.

In addition, there is a beacon period (BP) that serves as a management domain for transmitting and receiving management information using a beacon (a beacon signal) at the head of the super frame, and beacon slots (BS) are arranged at specified intervals. Each wireless communication device 10 is set with a specified beacon slot, and can exchange parameters for performing network management or access control with the wireless communication devices 10 in the vicinity. FIG. 2 shows an example in which 9 beacon slots are set, namely, BS0 to BS8, as the beacon period. Note that, the period that is not set as the beacon period is normally used as a data transmission region.

Figure 3:
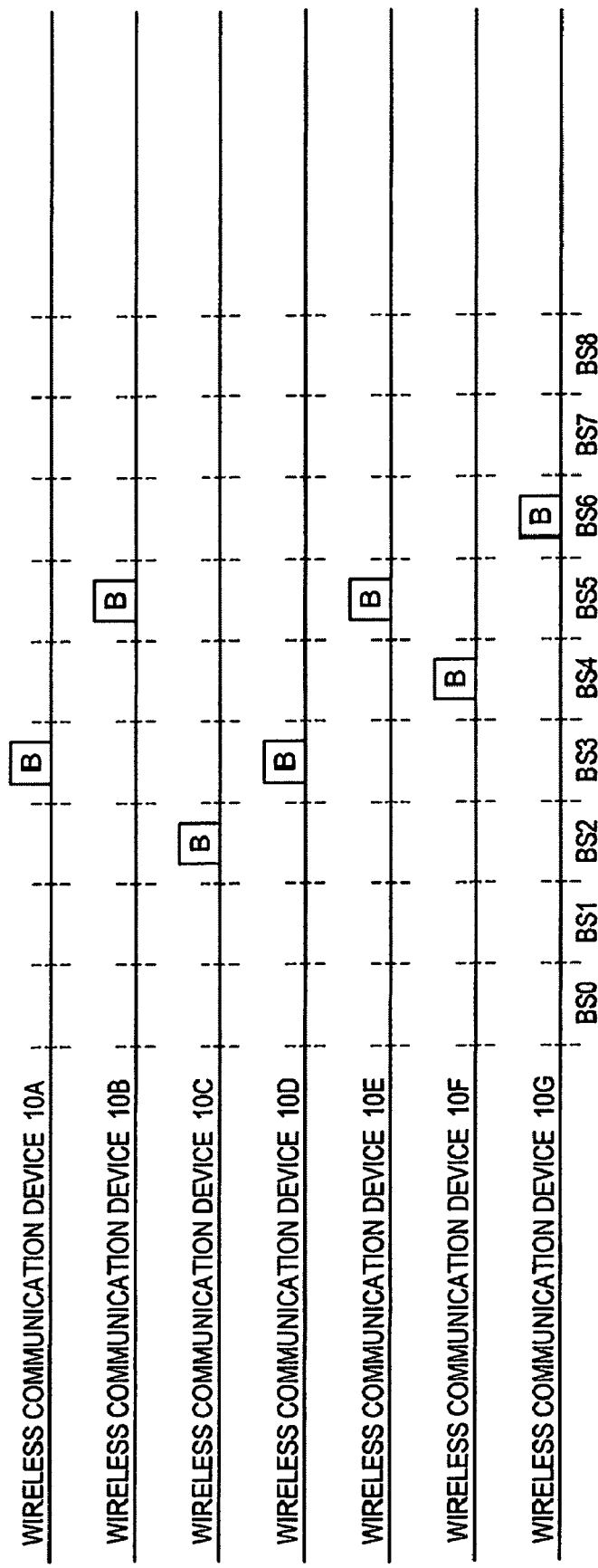
FIG. 3 is a conceptual diagram showing respective beacon slot positions that are set by each wireless communication device for itself.

FIG. 3 is a conceptual diagram showing beacon slot positions that are set by each wireless communication device 10 for itself in the case that the wireless communication device 10A to the wireless communication device 10G form one wireless communication system. FIG. 3 shows a state where, after all of the wireless communication devices 10 that form one wireless communication system 1 have notified each other about un-occupied beacon slots, each wireless communication device 10 has selected the beacon slot it is going to use.

In the example shown in FIG. 3, the wireless communication device 10A transmits its beacon using BS3, and the wireless communication device 10B transmits its beacon using BS5. Similarly, the wireless communication device 10C transmits its beacon using BS2, and the wireless communication device 10D transmits its beacon using BS3. The wireless communication device 10E transmits its beacon using BS5. Further, the wireless communication device 10F transmits its beacon using BS4, and the wireless communication device 10G transmits its beacon using BS6.

In the example shown in FIG. 3, the wireless communication device 10A and the wireless communication device 10D share use of the shared BS3, and the wireless communication device 10B and the wireless communication device 10E share use of the shared BS5. However, the wireless communication device 10A and the wireless communication device 10D are away from each other by 3 hops or more, and the wireless communication device 10B and the wireless communication device 10E are also away from each other by 3 hops or more. Therefore, it is assumed that a plurality of wireless communication devices can use the shared BS without any practical problem.

Note that, in order that a wireless communication device can newly join the wireless communication system 1, BS0, BS1, BS7 and BS8 can be reserved as necessary. Normally, a specified number of free beacon slots are provided after the beacon slot of each wireless communication device 10. The free beacon slots are provided in case a wireless communication device newly joins the wireless communication system 1.

1-3. TFC Code

Next, a time frequency code (TFC) will be described with reference to FIG. 4 and FIG. 5.

Figure 4:
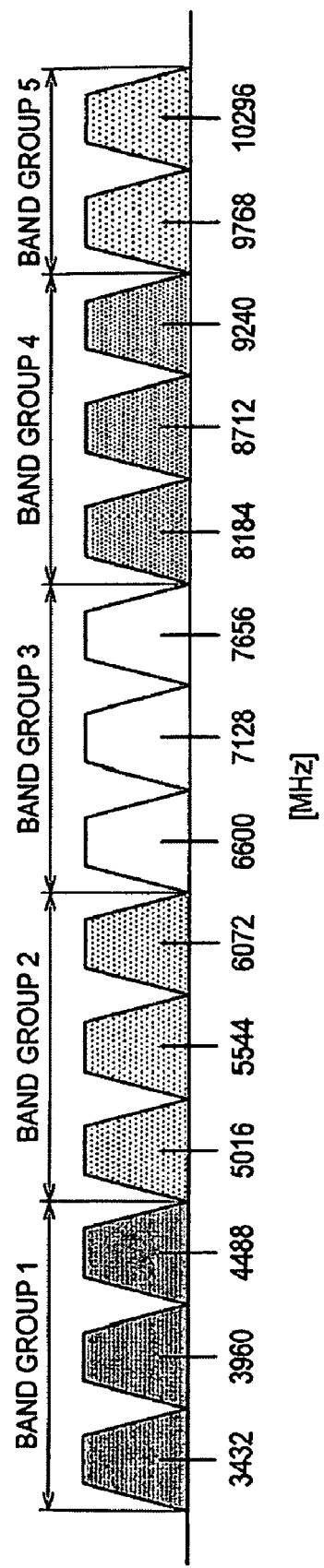
FIG. 4 is an explanatory diagram showing the configuration of a frequency channel of a multiband orthogonal frequency division multiplexing (OFDM) system.

FIG. 4 is an explanatory diagram showing the configuration of a frequency channel of a multiband orthogonal frequency division multiplexing (OFDM) system. As shown in FIG. 4, in the Wimedia Alliance Multi Band OFDM PHY specification, it is defined that 14 sub bands, each with a 528 MHz bandwidth, are allocated between 3.1 GHz and 10.6 GHz.

In addition, a band group 1, a band group 2, a band group 3, and a band group 4 are formed by delimiting groups of 3 sub bands in order form the low frequency sub bands. The remaining 2 sub bands form a band group 5.

By changing the frequency hopping pattern for each band group described above, the TFC codes 1 to 10 shown in FIG. 5A to FIG. 5J can be configured.

Figure 5A:
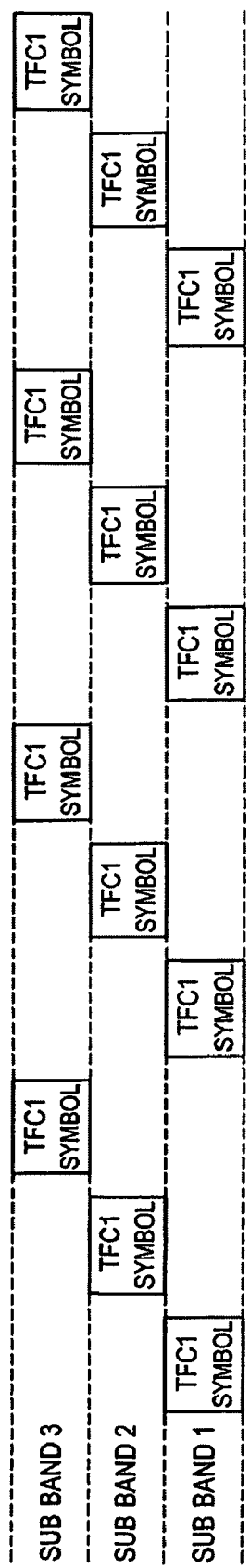
FIG. 5A is an explanatory diagram showing a frequency hopping pattern of time frequency code (TFC) 1.
Figure 5C:
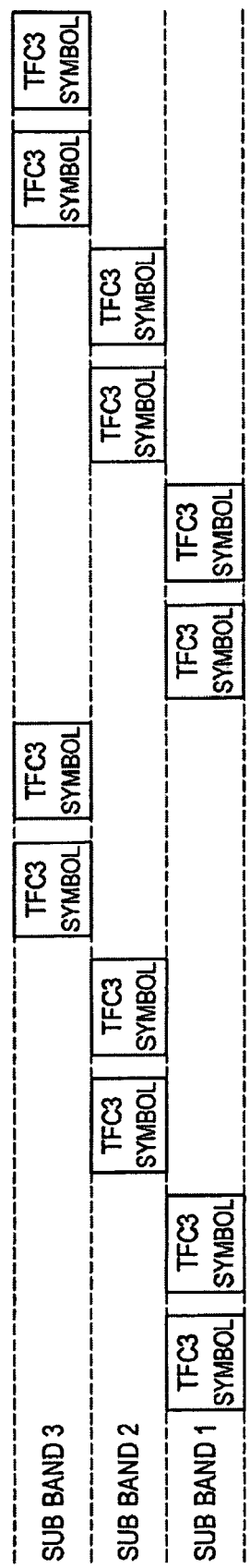
FIG. 5C is an explanatory diagram showing a frequency hopping pattern of TFC 3.
Figure 5D:
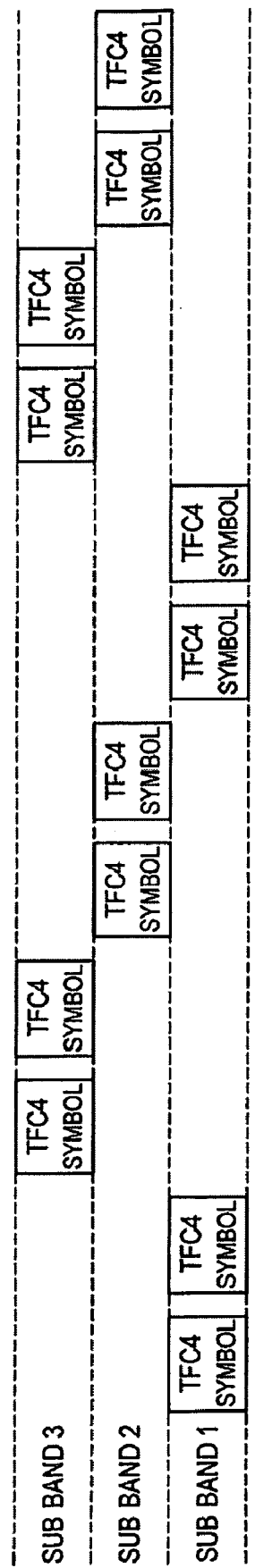
FIG. 5D is an explanatory diagram showing a frequency hopping pattern of TFC 4.
Figure 5F:
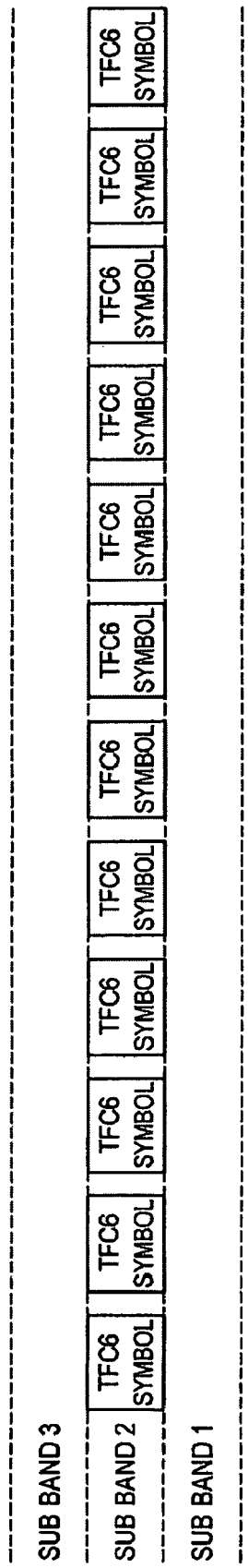
FIG. 5F is an explanatory diagram showing a frequency hopping pattern of TFC 6.
Figure 5G:
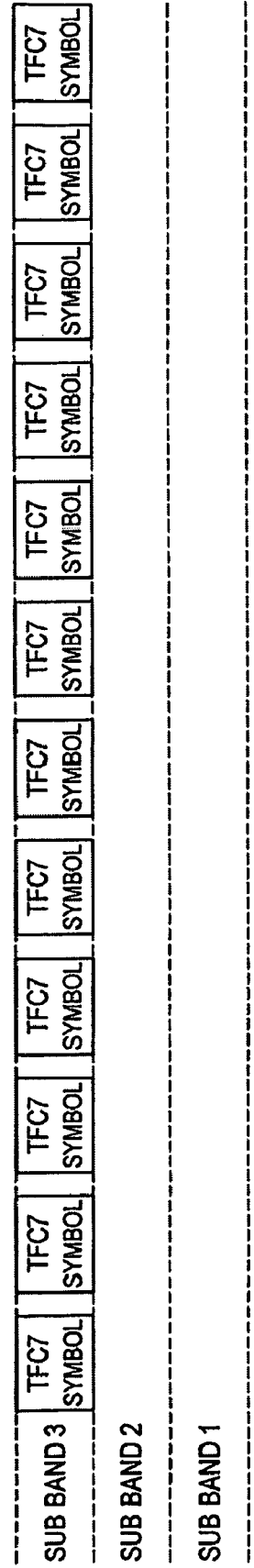
FIG. 5G is an explanatory diagram showing a frequency hopping pattern of TFC 7.
Figure 5H:
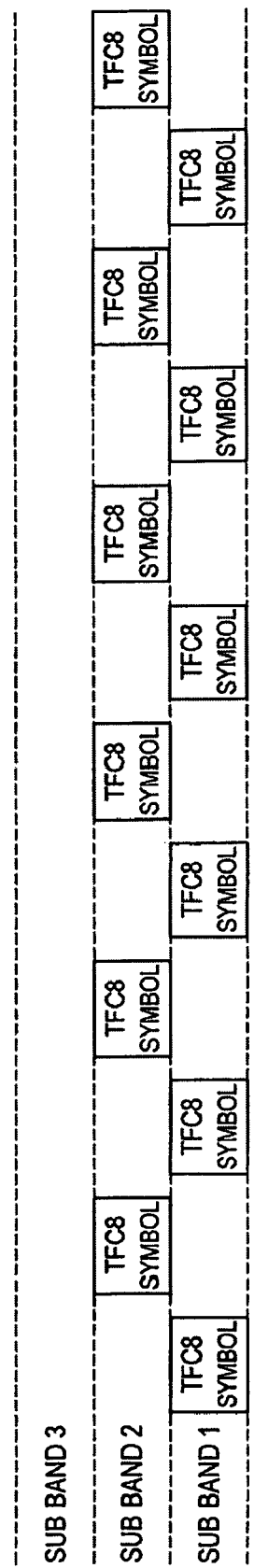
FIG. 5H is an explanatory diagram showing a frequency hopping pattern of TFC 8.
Figure 5I:
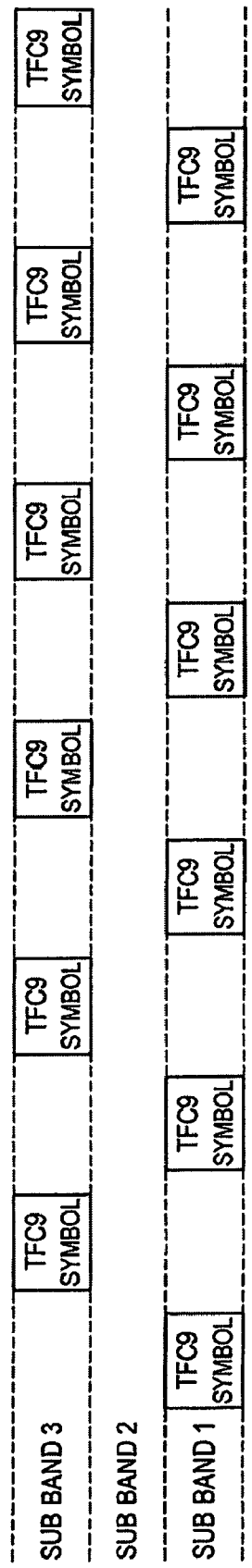
FIG. 5I is an explanatory diagram showing a frequency hopping pattern of TFC 9.

FIG. 5A to FIG. 5J are explanatory diagrams each showing an example of a frequency hopping pattern of each TFC code. More specifically, FIG. 5A shows a frequency hopping pattern of TFC 1, FIG. 5B shows a frequency hopping pattern of TFC 2, FIG. 5C shows a frequency hopping pattern of TFC 3, FIG. 5D shows a frequency hopping pattern of TFC 4, FIG. 5E shows a frequency hopping pattern of TFC 5, FIG. 5F shows a frequency hopping pattern of TFC 6, FIG. 5G shows a frequency hopping pattern of TFC 7, FIG. 5H shows a frequency hopping pattern of TFC 8, FIG. 5I shows a frequency hopping pattern of TFC 9, and FIG. 5J shows a frequency hopping pattern of TFC 10.

The frequency hopping pattern is defined by a channel code called TFC. For example, when the channel is TFC 1, the sub band that is used is changed in accordance with the rule sub band 1, sub band 2, sub band 3, sub band 1, sub band 2, sub band 3 as shown in FIG. 5A. Note that, among the sub bands forming a certain band group, the sub band with the lowest frequency band may be sub band 1, the sub band with the highest frequency band may be sub band 3, and the intermediate sub band between the sub band 1 and the sub band 3 may be sub band 2.

In addition, when the channel is TFC 2, the sub band that is used is changed in accordance with the rule sub band 1, sub band 3, sub band 2, sub band 1, sub band 3, sub band 2 as shown in FIG. 5B.

When the channel is TFC 3, the sub band that is used is changed in accordance with the rule sub band 1, sub band 1, sub band 2, sub band 2, sub band 3, sub band 3 as shown in FIG. 5C. Similarly, when the channel is TFC 4, the sub band that is used is changed in accordance with the rule sub band 1, sub band 1, sub band 3, sub band 3, sub band 2, sub band 2 as shown in FIG. 5D.

In the multi band OFDM system, patterns in which the same sub band continues to be used are pre-set such as TFC 5 to TFC 7.

For example, when the channel is TFC 5, sub band 1s continuously used as shown in FIG. 5E. When the channel is TFC 6, sub band 2 is continuously used as shown in FIG. 5F. Similarly, when the channel is TFC 7, sub band 3 is continuously used as shown in FIG. 5G.

In addition, patterns in which frequency hopping is performed between two sub bands are pre-set such as TFC 8 to TFC 10.

More specifically, as shown in FIG. 5H, when the channel is TFC 8, only sub band 1 and sub band 2 are alternately used. Further, as shown in FIG. 5I, when the channel is TFC 9, only sub band 1 and sub band 3 are alternately used. Similarly, as shown in FIG. 5J, when the channel is TFC 10, only sub band 2 and sub band 3 are alternately used. In this manner, the frequency hopping pattern to be used is determined by the set TFC code.

Further, a specified preamble sequence that corresponds with each TFC code is pre-set in the used TFC code. The preamble is a synchronization signal that is attached to the signal that is transmitted/received. Note that the square frames shown in FIG. 5A to FIG. 5J may be one OFDM symbol, or may be data transmitted in a 312.5 ns duration time interval.

2. BACKGROUND OF THE PRESENT EMBODIMENT

In the known multiband OFDM system, as described in "1-3. TFC code", the method is defined in which a radio signal is transmitted in accordance with a specific frequency hopping pattern specified by one TFC code. Further, with the known multiband OFDM system, it has been suggested that defining a plurality of TFC codes makes it possible for a plurality of wireless communication devices to coexist while using different TFC codes. In other words, it has been suggested that, if other wireless communication devices that use different TFC codes are present in the vicinity, a given wireless communication device can coexist with the other wireless communication devices because it cannot decode radio signals transmitted from the other wireless communication devices.

For example, if the start timings are the same, the percentage of time during which the same sub band is used is approximately 30% in the frequency hopping pattern defined by TFC 1 and the frequency hopping pattern defined by TFC 2. However, it has been suggested that the sub band overlapping only affects a packet error rate of only a few percent, owing to an error correction technique.

In the WiMedia Distributed MAC Layer Specification, a method is described in which wireless communication devices exchange beacons in a beacon period determined in advance to thereby ensure network maintenance and synchronization.

Further, in a wireless communication system of the IEEE802.11 series, currently, a task group N (a separate meeting: N) is attempting to standardize a technique for realizing high-speed communication that uses a plurality of frequency bands. This task group N has proposed, as a technique for realizing high speed communication, a method that doubles the bandwidth by using a plurality of bands, for example.

Figure 6B:
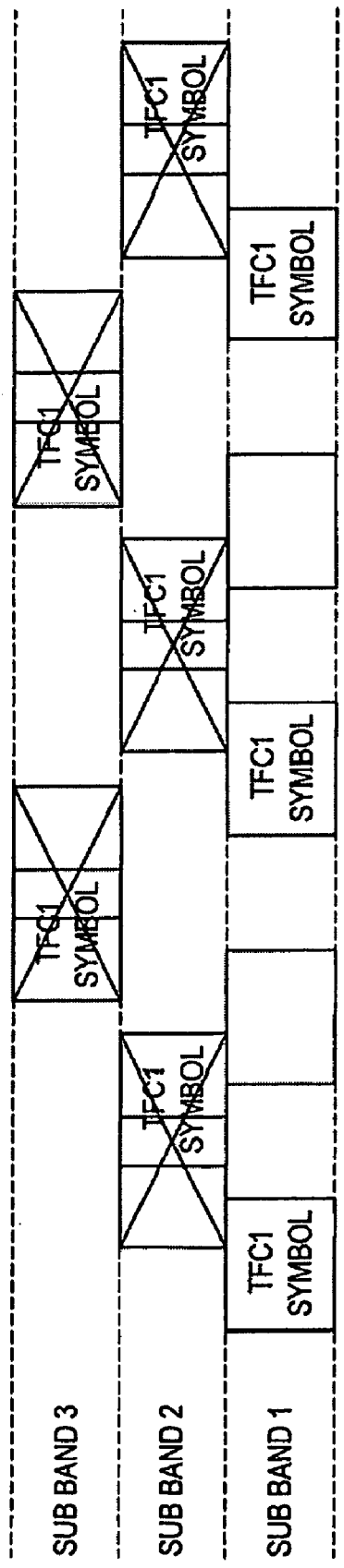
FIG. 6B is an explanatory diagram showing problem points when one wireless communication device transmits radio signals in a multiplexed manner using different frequency hopping patterns.

When a given wireless communication device transmits radio signals using frequency hopping patterns defined by a plurality of TFC codes at the same time, the same sub band may be used at the same time even if the frequency hopping patterns are different from each other as shown in FIG. 6A to FIG. 6C FIG. 6A to FIG. 6C are explanatory diagrams each showing problem points when one wireless communication device transmits radio signals in a multiplexed manner using different frequency hopping patterns. Note that, in FIG. 6A to FIG. 6C, a frequency hopping pattern of one type of radio signal is shown by squares with characters, and a frequency hopping pattern of another type of radio signal is shown by blank squares.

For example, as shown by X marks in FIG. 6A, if one wireless communication device transmits radio signals in a multiplexed manner using the frequency hopping patterns defined by TFC 1 and TFC 2 at the same start timing, the same sub band is used at the same timing. If the percentage of time during which interference occurs is one-third as shown in FIG. 6A, a receiving destination device cannot separate the multiplexed radio signals. As a result, it is difficult to accurately decode the radio signals. The above interference acts as an obstacle for performing high speed communication, for example, at a physical rate of several hundreds of Mbps.

Further, as shown by the X marks in FIG. 6B, if one wireless communication device uses the frequency hopping patterns defined by TFC 1 and TFC 2 at start timings that differ from each other by about 1.5 symbols, the percentage of time during which the same sub band is used is approximately two-thirds. If the percentage of time during which interference occurs is approximately two-thirds as shown in FIG. 6B, the receiving destination device cannot separate the multiplexed radio signals. As a result, it is difficult to accurately decode the radio signals. The above interference acts as an obstacle for performing satisfactory communication, for example, even at the lowest physical rate.

Furthermore, as shown by the X marks in FIG. 6C, if one wireless communication device uses the frequency hopping patterns defined by TFC 1 and TFC 3 at start timings that differ from each other by about 0.5 symbol, the same sub band is used at the same timing also in this case. If such interference occurs, the receiving destination device cannot separate the multiplexed radio signals. As a result, it is difficult to accurately decode the radio signals.

When a wireless communication device that uses a different TFC code is present near a given wireless communication device, the given wireless communication device may erroneously detect a radio signal that has a preamble with a high correlation and that is transmitted using the different TFC code, as a signal transmitted using the TFC code of the device itself. Further, a problem has sometimes occurred in which, if a plurality of radio signals are multiplexed and transmitted using different TFC codes and if all of the used sub bands overlap, it is difficult for the receiving destination device to detect the radio signals.

Moreover, a problem has sometimes occurred in which, if the receiving destination device receives radio signals from a plurality of wireless communication devices at approximately the same time, a radio signal that has arrived at the receiving destination device at an earlier timing is synchronized even in a situation where different TFC codes are used. As a result, the receiving destination device cannot decode a desired radio signal.

It has been suggested that beacons can be transmitted and received only between wireless communication devices that operate on the same TFC code. Therefore, In the WiMedia Distributed MAC Layer Specification does not particularly define a method for detecting beacons that are transmitted using different TFC codes. As a result, when radio signals are transmitted using a plurality of different TFC codes at the same time, beacons have to be transmitted using respective TFC codes.

In addition, when data is transmitted using a plurality of different TFC codes, it has been necessary to provide notification in advance, between the wireless communication device at the transmission source and the receiving destination device, that data is being transmitted using a plurality of different TFC codes.

Moreover, a beacon period utilizing different TFC codes may be moved to a completely different position by the action of another wireless communication device that operates on one of the TFC codes being utilized by the beacon period. In other words, when a plurality of TFC codes are used at the same time, a problem has sometimes occurred in which, if a beacon period of the TFC code of one of the transmission source device and the receiving destination device is moved to a completely different position, beacons cannot be transmitted using the same timing.

On the other hand, the method employed by the task group N of the IEEE802.11 series uses a plurality of bands to double the bandwidth. Since this method simply doubles the bandwidth, it is necessary to ensure compatibility with known systems. As a result, when the doubled bandwidth is used, effective communication can only be performed during the time period when the bands of both parties, i.e., the transmission source device and the receiving destination device are available. Accordingly, substantial decrease in throughput has been a problem. In addition, because an ultra wide band communication system uses a very weak signal, a problem has sometimes occurred in which the use of carrier sense multiplex defined by the multiplexing protocol of the IEEE802.11 series is difficult.

Thus, in light of the above-described circumstances, the wireless communication device 10 according to the present embodiment has been created. According to the wireless communication device 10 of the present embodiment, a transmission bandwidth can be increased in one direction. Hereinafter, the wireless communication device 10 will be described with reference to FIG. 7 to FIG. 15.

3. DETAILED DESCRIPTION OF THE PRESENT EMBODIMENT

3-1. Outline of Wireless Communication According to the Present Embodiment

First, the use state of respective sub bands of radio signals that are transmitted in a multiplexed manner by the wireless communication device 10 according to the present embodiment will be described with reference to FIG. 7A to FIG. 7E.

FIG. 7A is an explanatory diagram showing a manner in which radio signals are multiplexed using frequency hopping patterns defined by TFC 1 and TFC 4. In the example shown in FIG. 7A, the start timing of the frequency hopping pattern defined by TFC 4 is delayed by 4 symbols, as a multiplex adjustment interval (an adjustment amount), than the start timing of the frequency hopping pattern defined by TFC 1.

As a result, the sub bands of both parties are not the same. Accordingly, the receiving destination device can separate and accurately decode the radio signals of both parties. More specifically, the sub bands of the radio signal corresponding to TFC 1 change in the order 1, 2, 3, 1, 2, 3, while the sub bands of the radio signal corresponding to TFC 4 change in the order 3, 3, 2, 2, 1, 1.

FIG. 7B is an explanatory diagram showing a manner in which radio signals are multiplexed using frequency hopping patterns defined by TFC 2 and TFC 3. In the example sown in FIG. 7B, the start timing of the frequency hopping pattern defined by TFC 3 is delayed by 4 symbols, as a multiplex adjustment interval, than the start timing of the frequency hopping pattern defined by TFC 2.

As a result, the sub bands of both parties are not the same. Accordingly, the receiving destination device can separate and accurately decode the radio signals of both parties. More specifically, the sub bands of the radio signal corresponding to TFC 2 change in the order 1, 3, 2, 1, 3, 2, while the sub bands of the radio signal corresponding to TFC 3 change in the order 2, 2, 3, 3, 1, 1.

FIG. 7C is an explanatory diagram showing a manner in which radio signals are multiplexed using frequency hopping patterns defined by TFC 8 and TFC 9. In the example sown in FIG. 7C, the start timing of the frequency hopping pattern defined by TFC 9 is delayed by 1 symbol, as a multiplex adjustment interval, than the start timing of the frequency hopping pattern defined by TFC 8.

As a result, the sub bands of both parties are not the same. Accordingly, the receiving destination device can separate and accurately decode the radio signals of both parties. More specifically, the sub bands of the radio signal corresponding to TFC 8 change in the order 1, 2, 1, 2, 1, 2, while the sub bands of the radio signal corresponding to TFC 9 change in the order 3, 1, 3, 1, 3, 1.

FIG. 7D is an explanatory diagram showing a manner in which radio signals are multiplexed using frequency hopping patterns defined by TFC 8 and TFC 10. In the example sown in FIG. 7D, the start timing of the frequency hopping pattern defined by TFC 10 is delayed by 1 symbol, as a multiplex adjustment interval, than the start timing of the frequency hopping pattern defined by TFC 8.

As a result, the sub bands of both parties are not the same. Accordingly, the receiving destination device can separate and accurately decode the radio signals of both parties. More specifically, the sub bands of the radio signal corresponding to TFC 8 change in the order 1, 2, 1, 2, 1, 2, while the sub bands of the radio signal corresponding to TFC 10 change in the order 2, 3, 2, 3, 2, 3.

FIG. 7E is an explanatory diagram showing a manner in which radio signals are multiplexed using frequency hopping patterns defined by TFC 9 and TFC 10. In the example sown in FIG. 7E, the start timing of the frequency hopping pattern defined by TFC 10 is delayed by 1 symbol, as a multiplex adjustment interval, than the start timing of the frequency hopping pattern defined by TFC 9.

As a result, the sub bands of both parties are not the same. Accordingly, the receiving destination device can separate and accurately decode the radio signals of both parties. More specifically, the sub bands of the radio signal corresponding to TFC 9 change in the order 1, 3, 1, 3, 1, 3, while the sub bands of the radio signal corresponding to TFC 10 change in the order 3, 2, 3, 2, 3, 2.

3-2. Configuration of Wireless Communication Device According to the Present Embodiment The use state of respective sub bands of radio signals that are transmitted in a multiplexed manner by the wireless communication device 10 according to the present embodiment is described above with reference to FIG. 7A to FIG. 7E. Next, the configuration of the wireless communication device 10 that enables the above-described transmission of radio signals will be described with reference to FIG. 8 to FIG. 12.

Figure 8:
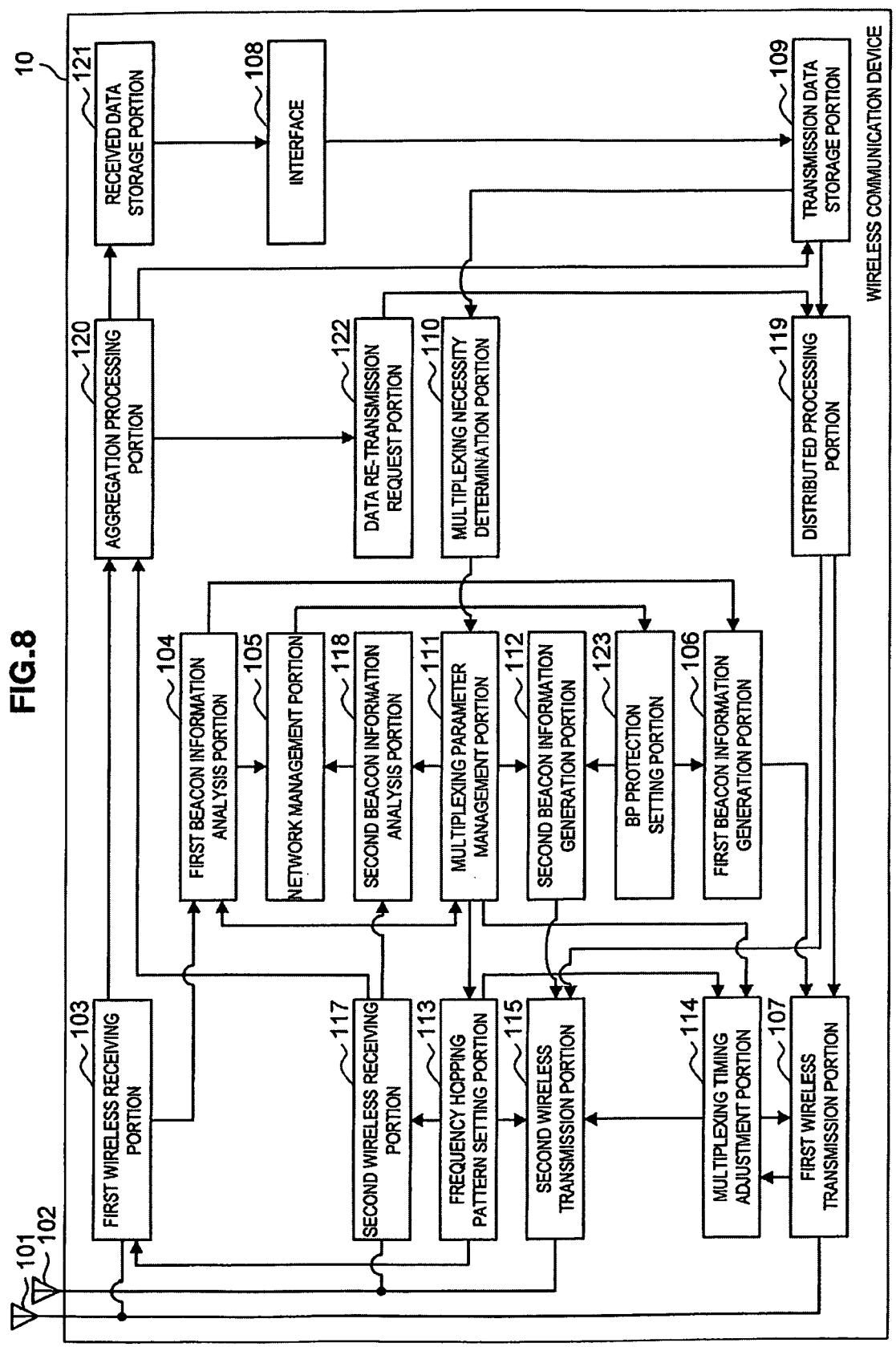
FIG. 8 is an explanatory diagram showing a configuration of a wireless communication device according to the present embodiment.

FIG. 8 is an explanatory diagram showing a configuration of the wireless communication device 10 according to the present embodiment. As shown in FIG. 8, the wireless communication device 10 includes a first antenna 101, a second antenna 102, a first wireless receiving portion 103, a first beacon information analysis portion 104, a network management portion 105, a first beacon information generation portion 106, a first wireless transmission portion 107, an interface 108, a transmission data storage portion 109, a multiplexing necessity determination portion 110, a multiplexing parameter management portion 111, a second beacon information generation portion 112, a frequency hopping pattern setting portion 113, a multiplexing timing adjustment portion 114, a second wireless transmission portion 115, a second wireless receiving portion 117, a second beacon information analysis portion 118, a distributed processing portion 119, an aggregation processing portion 120, a received data storage portion 121, a data re-transmission request portion 122, and a BP protection setting portion 123.

The first antenna 101s an interface with wireless communication devices in the vicinity, and receives radio signals transmitted from the wireless communication devices in the vicinity or transmits radio signals to the wireless communication devices in the vicinity. More specifically, the first antenna 101 receives radio signals transmitted from the wireless communication devices in the vicinity, and supplies the radio signals, as high frequency signals, to the first wireless receiving portion 103 and the second wireless receiving portion 117. Further, the first antenna 101 transmits high frequency signals generated by the first wireless transmission portion 107 as radio signals.

The second antenna 102 is an interface with wireless communication devices in the vicinity like the first antenna 101, and receives radio signals transmitted from the wireless communication devices in the vicinity or transmits radio signals to the wireless communication devices in the vicinity. Note that, although a plurality of antennas are provided in the wireless communication device 10 in the example shown in FIG. 8, the number of antennas provided in the wireless communication device 10 may be one.

The first wireless receiving portion 103 functions as a first receiving portion that performs reception processing of radio signals that are transmitted using a frequency hopping pattern (a first frequency hopping pattern) defined by a first TFC code. More specifically, when the first wireless receiving portion 103 detects a preamble corresponding to the first TFC code, it synchronizes a radio signal transmitted later with the preamble and receives the synchronized signal. Note that the first TFC code is set by the frequency hopping pattern setting portion 113.

The first beacon information analysis portion 104 extracts a beacon from the radio signal received by the first wireless receiving portion 103, and analyses information described in the beacon. Here, the structure of a beacon transmitted and received in the present embodiment will be described with reference to FIG. 9A to FIG. 9F.

Figure 9A:
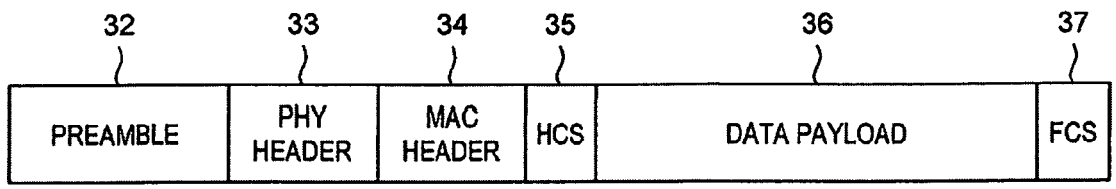
FIG. 9A is an explanatory diagram showing an example of the structure of a typical frame.
Figure 9B:
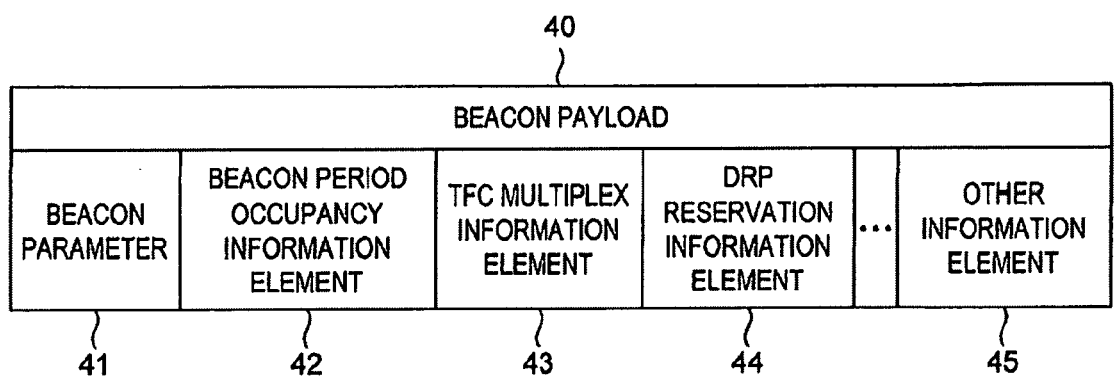
FIG. 9B is an explanatory diagram showing an example of the structure of a payload included in a beacon frame.
Figure 9C:
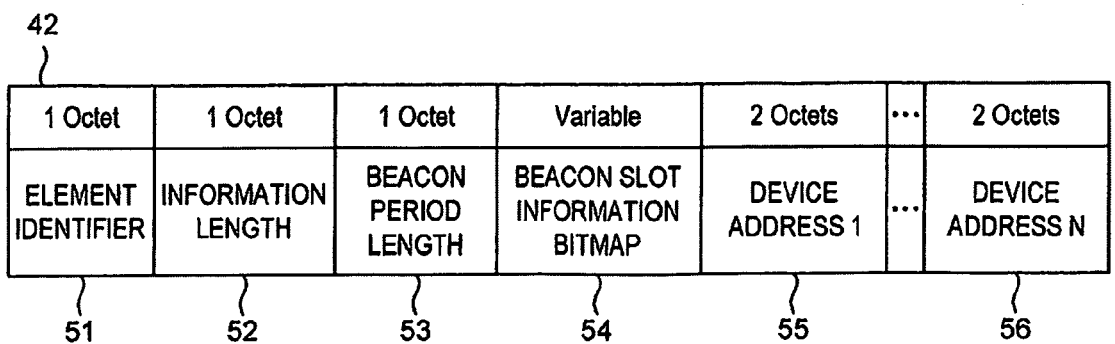
FIG. 9C is an explanatory diagram showing an example of the structure of a beacon period occupancy information element.

FIG. 9A to FIG. 9F are explanatory diagrams each showing a frame structure of a radio signal transmitted from the wireless communication device 10. More specifically, FIG. 9A is an explanatory diagram showing an example of the structure of a typical frame. FIG. 9B is an explanatory diagram showing an example of the structure of a payload included in a beacon frame. FIG. 9C is an explanatory diagram showing an example of the structure of a beacon period occupancy information element. FIG. 9D is an explanatory diagram showing an example of the structure of a distributed reservation protocol (DRP) reservation information element. FIG. 9E is an explanatory diagram showing an example of the structure of a beacon period switch information element. FIG. 9F is an explanatory diagram showing an example of the structure of a transport format combination (TFC) multiplex information element.

As shown in FIG. 9A, the typical frame includes a preamble 32, a PHY header 33, a MAC header 34, a header check sequence (HCS) 35, a data payload 36, and a frame check sequence (FCS) 37.

Information about a physical rate of the data payload 36 and the like is described in the PHY header 33. The sender of the frame and the destination address of the frame are described in the MAC header 34. The HCS 35 is added in order to detect errors in the header sections.

The data payload 36 is a user data that is structured using a given physical rate. The FCS 37 is added in order to detect errors in the data payload 36.

With the above-described basic frame structure, a beacon frame, a data frame, and an acknowledgement (ACK) frame and the like are structured.

As shown in FIG. 9B, a beacon payload 40 basically includes a beacon parameter 41 that describes unique parameters of the wireless communication device 10, and a beacon period occupancy information element (BPO IE) 42 that shows an occupancy state of the beacon slots. Further, the beacon payload 40 may additionally include any information element.

For example, the beacon payload 40 shown in FIG. 9B additionally includes a TFC multiplex information element (Multiplex IE) 43 that notifies whether multiplex communication is necessary, a DRP reservation information element (DRP IE) 44 that describes information of a reservation slot used to perform communication, and another information element 45.

As shown in FIG. 9C, an element identifier 51 for identifying the type of an information element that is subsequently described, an information length 52 of the information element, and parameters of the information element are described in the beacon period occupancy information element 42.

FIG. 9C shows an example in which a beacon period length 53 that is recognized by the device itself, a beacon slot information bitmap 54 that reports the occupancy state of each beacon slot, and a device address 1 (55) to a device address N (56) showing the device that uses each beacon slot are described.

As shown in FIG. 9D, an element identifier 61 for identifying the type of an information element that is subsequently described, an information length 62 of the information element, and parameters of the information element are described in the DRP reservation information element 44.

FIG. 9D shows an example in which a DRP reservation control information 63 in which the type of DRP reservation, the reservation state and the like are described, a target/owner device address 64 for identifying a reservation counterpart, and a DRP allocation 1 (65) to a DRP allocation N (66) that indicate actually reserved MAS are described.

As shown in FIG. 9E, an element identifier 71 for identifying the type of an information element that is subsequently described, an information length 72 of the information element, and parameters of the information element are described in a beacon period switch information element 70.

FIG. 9E shows an example in which a beacon period move count down 73 that indicates time until a beacon period is moved, a beacon slot position 74 that indicates the position of a beacon slot after being moved, a beacon period start time (BPST) start position 75 that indicates the timing of the BPST (i.e., the head of the super frame) to be changed are described. Note that, although FIG. 9B shows an example in which the beacon payload 40 does not include the beacon period switch information element 70, the beacon payload 40 may include the beacon period switch information element 70.

As shown in FIG. 9F, an element identifier 81 for identifying the type of an information element that is subsequently described, an information length 82 of the information element, and parameters of the information element are described in the TFC multiplex information element 43.

FIG. 9F shows an example that includes a first TFC code 83 that indicates the value of a primary TFC code, a second TFC code 84 that indicates the value of a TFC code to be multiplexed, a BPST start position 85 that indicates the timing of the BPST (i.e., the head of the super frame) of the multiplexed TFC, and an available TFC bitmap 86 that shows TFC codes that are available for the device itself for multiplex communication.

Based on the above-described TFC multiplex information element 43, the wireless communication device 10 according to the present embodiment can confirm whether a communication counterpart is capable of multiplexing communication, and can notify the communication counterpart that the device itself is capable of multiplexing communication. Further, the wireless communication device 10 can reserve multiplex communication in a particular MAS by using the DRP reservation information element 44 and the TFC multiplex information element 43 in combination.

Here, the configuration of the wireless communication device 10 according to the present embodiment will be described again with reference to FIG. 8. The network management portion 105 is provided with beacon analysis results from the first beacon information analysis portion 104 and the second beacon information analysis portion 118, and beacon reception timing. The network management portion 105 controls various parameters based on the beacon analysis results and the beacon reception timing in order to achieve synchronization in the wireless network.

The first beacon information generation portion 106 functions as a first beacon generation portion that generates a beacon that is transmitted from the first wireless transmission portion 107. The first wireless transmission portion 107 functions as a first transmission portion that transmits a radio signal using the frequency hopping pattern defined by the first TFC code. For example, the first wireless transmission portion 107 transmits the beacon generated by the first beacon generation portion 106, in a beacon period (a first beacon period) of the wireless network that operates on the first TFC code.

The interface 108 is an input/output portion with an application device connected to the wireless communication device 10 or an application device integrally formed with the wireless communication device 10. For example, transmission data to be transmitted from the wireless communication device 10 is input to the interface 108, and received data received by the wireless communication device 10 is output from the interface 108.

The transmission data storage portion 109 functions as a transmission buffer that temporality stores the transmission data input from the application device via the interface 108. The received data storage portion 121 functions as a reception buffer that temporality stores the received data received by the first wireless receiving portion 103 and the second wireless receiving portion 117. The received data stored in the received data storage portion 121 is output to the application device via the interface 108.

The multiplexing necessity determination portion 110 functions as a determination portion that determines whether or not transmission of a radio signal from the second wireless transmission portion 115 is necessary, that is, whether or not multiplexing of radio signals is necessary.

For example, the multiplexing necessity determination portion 110 may determine that multiplexing is necessary when a data amount of unsent transmission data stored in the transmission data storage portion 109 exceeds a predetermined amount, and may determine that multiplexing is not necessary when the data amount becomes less than or equal to the predetermined amount. With this configuration, when the data amount of the unsent transmission data stored in the transmission data storage portion 109 exceeds the predetermined value, the transmission bandwidth of the wireless communication device 10 is increased. Accordingly, even when the data amount of the unsent transmission data stored in the transmission data storage portion 109 exceeds the predetermined value, the transmission data can be rapidly transmitted.

Alternatively, the multiplexing necessity determination portion 110 may determine that multiplexing is necessary when an increase speed of unsent transmission data stored in the transmission data storage portion 109 exceeds a predetermined speed, and may determine that multiplexing is not necessary when the increase speed becomes less than or equal to the predetermined speed.

With this configuration, when the increase speed of the unsent transmission data stored in the transmission data storage portion 109 exceeds the predetermined speed, the transmission bandwidth of the wireless communication device 10 is increased. Accordingly, even when the increase speed of the unsent transmission data stored in the transmission data storage portion 109 exceeds the predetermined speed, an overflow of the unsent transmission data in the transmission data storage portion 109 can be prevented.

Figure 10:
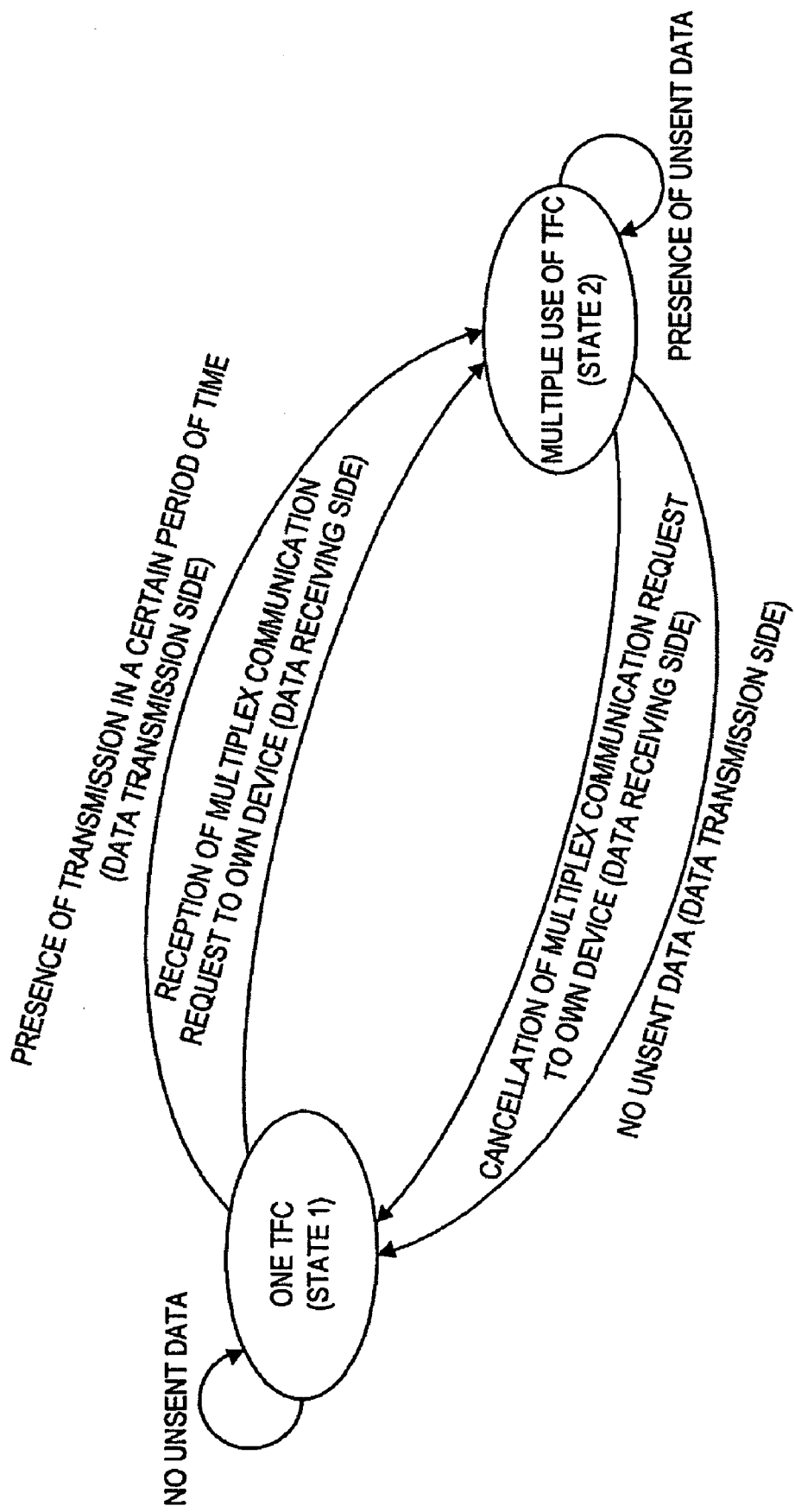
FIG. 10 is a state transition diagram showing a transition between a normal communication state and a multiplex communication state.

Moreover, the multiplexing necessity determination portion 110 may determine whether or not multiplexing is necessary based on a state transition diagram shown in FIG. 10.

FIG. 10 is a state transition diagram showing a transition between a normal communication state and a multiplex communication state. As shown in FIG. 10, when the communication state is state 1 (a state where only one TFC code is used), if there is no transmission data in the transmission data storage portion 109, the multiplexing necessity determination portion 110 maintains the state 1. On the other hand, if some transmission data remains in the transmission data storage portion 109 after a certain period of time has elapsed, or if a request for multiplex communication is received by the device itself, the multiplexing necessity determination portion 110 determines that the communication state is to be shifted to state 2 (a state where two TFC codes are used in a multiplexed manner).

When the communication state is the state 2, if there is transmission data in the transmission data storage portion 109, the multiplexing necessity determination portion 110 maintains the state 2. On the other hand, if transmission data is no longer present in the transmission data storage portion 109, or if the request of multiplex communication to the device itself has been cancelled, the multiplexing necessity determination portion 110 determines that the communication state is to be shifted to the state 1.

The multiplexing parameter management portion 111 manages each parameter when a radio signal is also transmitted from the second wireless transmission portion 115 in a multiplexed manner. The second beacon information generation portion 112 functions as a second beacon generation portion that generates a beacon that is transmitted from the second wireless transmission portion 115.

When the multiplexing necessity determination portion 110 determines that multiplexing is necessary, the frequency hopping pattern setting portion 113 sets the second TFC code to cause the second wireless transmission portion 115 or the second wireless receiving portion 117 to operate on the second TFC code. Here, the frequency hopping pattern setting portion 113 functions as a storage portion that associates and stores the combination of frequency hopping patterns and the multiplex adjustment interval. More specifically, as shown in FIG. 7A to FIG. 7E, the frequency hopping pattern setting portion 113 associates and stores the combination of frequency hopping patterns, and the multiplex adjustment interval that can suppress interference when the combination of the frequency hopping patterns are used for multiplexing.

For example, the frequency hopping pattern setting portion 113 associates and stores the combination of the frequency hopping patterns defined by TFC 1 and TFC 4, and time corresponding to 4 OFDM symbols as the multiplex adjustment interval (refer to FIG. 7A). Similarly, the frequency hopping pattern setting portion 113 associates and stores the combination of the frequency hopping patterns defined by TFC 2 and TFC 3, and time corresponding to 4 OFDM symbols (refer to FIG. 7B). Further, The frequency hopping pattern setting portion 113 associates and stores the frequency hopping patterns defined by TFC 8 and TFC 9, and time corresponding to 1 OFDM symbol (refer to FIG. 7C). The frequency hopping pattern setting portion 113 associates and stores the frequency hopping patterns defined by TFC 8 and TFC 10, and time corresponding to 1 OFDM symbol (refer to FIG. 7D). The frequency hopping pattern setting portion 113 associates and stores the frequency hopping patterns defined by TFC 9 and TFC 10, and time corresponding to 1 OFDM symbol (refer to FIG. 7E).

Note that the frequency hopping pattern setting portion 113 may incorporate a storage medium such as, for example, a non-volatile memory such as an electrically erasable programmable read-only memory (EEPROM), an erasable programmable read-only memory (EPROM), or the like, a magnetic disk such as a hard disk, a magnetic material disc, or the like, an optical disk such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-ray™ disc recordable (BD-R), a Blu-ray™ disc rewritable (BD-RE), or the like, or a magneto-optical (MO) disk. The above-described combination of the frequency hopping patterns and the multiplex adjustment interval may be recorded in the above storage medium.

In addition, when it is determined that multiplexing of radio signals is necessary at the time of transmission, the frequency hopping pattern setting portion 113 (a setting portion) sets, as the second TFC code, a frequency hopping pattern that suitably matches a frequency hopping pattern used by the first wireless transmission portion 107. Further, the frequency hopping pattern setting portion 113 outputs the multiplex adjustment interval corresponding to the combination of the first TFC code and the second TFC code to the multiplexing timing adjustment portion 114. For example, when the first wireless transmission portion 107 uses the frequency hopping pattern defined by TFC 1, the frequency hopping pattern setting portion 113 sets TFC 4 as the second TFC code. Further, the frequency hopping pattern setting portion 113 outputs, as the multiplex adjustment interval, a time corresponding to 4 symbols to the multiplexing timing adjustment portion 114.

The multiplexing timing adjustment portion 114 controls the first wireless transmission portion 107 and the second wireless transmission portion 115, based on the multiplex adjustment interval output from the frequency hopping pattern setting portion 113. For example, the multiplexing timing adjustment portion 114 performs control such that the start timing of the frequency hopping pattern used by the second wireless transmission portion 115 is delayed from the start timing of the frequency hopping pattern used by the first wireless transmission portion 107 by the multiplex adjustment interval output from the frequency hopping pattern setting portion 113.

The second wireless transmission portion 115 functions as a second transmission portion that modulates the transmission data stored in the transmission data storage portion 109 based on the control of the multiplexing timing adjustment portion 114. The transmission data modulated by the second wireless transmission portion 115 is transmitted from the second antenna 102 as a radio signal.

As a result, as shown in FIG. 7A to FIG. 7E, the sub bands used by the first wireless transmission portion 107 and the sub bands used by the second wireless transmission portion 115 do not overlap each other. Therefore, the receiving destination device can separate and decode a plurality of types of radio signals. In other words, the wireless communication device 10 can increase the transmission bandwidth by transmitting a plurality of types of radio signals while suppressing interference.

The second wireless transmission portion 115 transmits the beacon generated by the second beacon generation portion 112, in a beacon period (a second beacon period) of the wireless network that operates on the second TFC code.

The second wireless receiving portion 117 functions as a second receiving portion that performs processing to receive radio signals that are transmitted using a frequency hopping pattern defined by the second TFC code set by the frequency hopping pattern setting portion 113. More specifically, if the second wireless receiving portion 117 detects a preamble corresponding to the second TFC code, it synchronizes a radio signal transmitted later with the preamble and receives the synchronized signal.

The second beacon information analysis portion 118 extracts a beacon from the radio signal received by the second wireless receiving portion 117, and analyses information described in the beacon.

When multiplexing communication is performed, the distributed processing portion 119 functions as an allocation portion that allocates the transmission data stored in the transmission data storage portion 109 to the first wireless transmission portion 107 and the second wireless transmission portion 115. Meanwhile, the aggregation processing portion 120 aggregates received data that have been received by the first wireless receiving portion 103 and the second wireless receiving portion 117. The functions of the distributed processing portion 119 and the aggregation processing portion 120 will be described with reference to FIG. 11A to FIG. 11E.

Figures 11D, 11E:
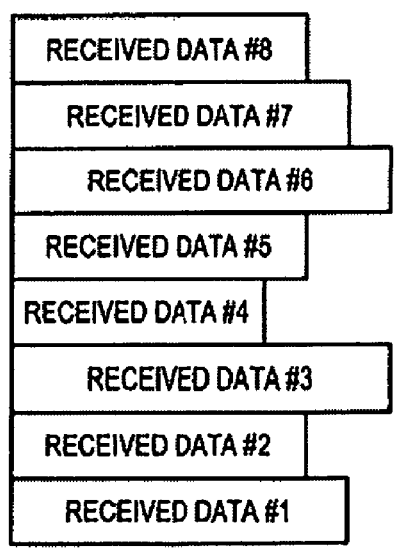
FIG. 11D is an explanatory diagram illustrating functions of the distributed processing portion and the aggregation processing portion.
FIG. 11E is an explanatory diagram illustrating functions of the distributed processing portion and the aggregation processing portion.

FIG. 11A to FIG. 11E are explanatory diagrams each illustrating functions of the distributed processing portion 119 and the aggregation processing portion 120. FIG. 11A shows a state where transmission data #1 to transmission data #8 are sequentially stored in the transmission data storage portion 109. The numbers #1 to #8 are sequence numbers allocated to each transmission data stored in the transmission data storage portion 109. The smaller the number is, the older the data is. Conversely, the larger the number is, the newer the data is.

When the transmission data is stored in the transmission data storage portion 109 as shown in FIG. 11A, the distributed processing portion 119 distributes the transmission data as shown in FIG. 11B. More specifically, the distributed processing portion 119 may distribute the transmission data stored in the transmission data storage portion 109 to the transmission data having odd sequence numbers and the transmission data having even sequence numbers.

Then, as shown in FIG. 11C, the data having an odd sequence number is transmitted from the first wireless transmission portion 107 based on the first TFC, and received by the first wireless receiving portion 103 of the receiving destination device based on the first TFC. In FIG. 11C, data #3 is colored to indicate that data #3 is not received properly by the receiving destination device, and re-transmission is requested by the data re-transmission request portion 122 of the receiving destination device.

Further, as shown in FIG. 11C, data having an even sequence number is transmitted from the second wireless transmission portion 115 based on the second TFC, and received by the second wireless receiving portion 117 of the receiving destination device based on the second TFC. In FIG. 11C, data #8 is colored to indicate that data #8 is not received properly by the receiving destination device, and re-transmission is requested by the data re-transmission request portion 122 of the receiving destination device.

If re-transmissions of data #3 and data #8 are requested in this manner, the distributed processing portion 119 may cause the first wireless transmission portion 107 to transmit data #8, and may cause the second wireless transmission portion 115 to transmit data #3 as shown in FIG. 11D. Alternatively, the distributed processing portion 119 may cause both the first wireless transmission portion 107 and the second wireless transmission portion 115 to transmit both the data #3 and data #8.

After that, the aggregation processing portion 120 of the receiving destination device aggregates the data received by the first wireless receiving portion 103 and the second wireless receiving portion 117, sorts the data in sequence number order, and outputs the data to the received data storage portion 121.

Here, the configuration of the wireless communication device 10 will be described again with reference to FIG. 8. When a beacon period is switched during multiplexing communication, the BP protection setting portion 123 protects a beacon period at the switching destination. The function of the BP protection setting portion 123 will be described later with reference to FIG. 14.

The function of the wireless communication device 10 according to the present embodiment has been described above, focusing on the content of the multiplexed transmission of a plurality of radio signals. However, even when the sub bands of a plurality of radio signals are different from each other, if the receiving destination device cannot detect the preamble corresponding to each radio signal, it cannot receive the plurality of radio signals properly. To address this, the multiplexing timing adjustment portion 114 may adjust the transmission periods of respective preambles corresponding to each radio signal as shown in FIG. 12.

FIG. 12 is an explanatory diagram showing transmission periods of respective preambles corresponding to each radio signal. More specifically, FIG. 12 shows a case in which the first wireless transmission portion 107 operates on TFC 1 and the second transmission portion 115 operates on TFC 4. In this case, the multiplexing timing adjustment portion 114 controls the second wireless transmission portion 115 such that transmission of the preamble corresponding to TFC 4 is started after transmission of the preamble corresponding to TFC 1 from the first wireless transmission portion 107. With this configuration, the receiving destination device can more reliably detect both the preamble corresponding to TFC 1 and the preamble corresponding to TFC 4.

3-3. Operation of the Wireless Communication Device According to the Present Embodiment Next, operations of the wireless communication device 10 according to the present embodiment will be described with reference to FIG. 13 to FIG. 15.

Figure 13:
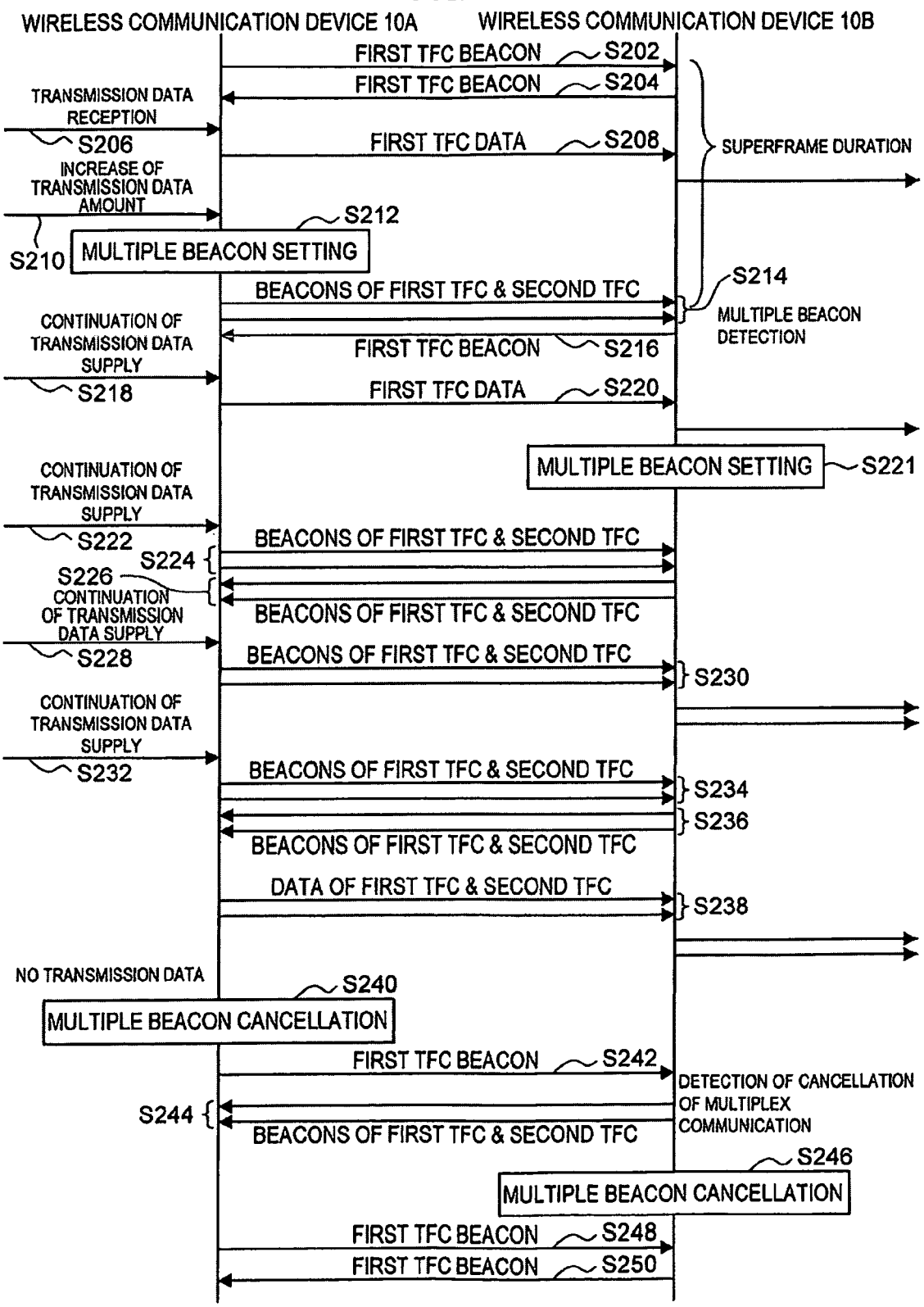
FIG. 13 is a sequence diagram showing the flow of processing from the setting of multiplexing communication to cancellation of the multiplexing communication.

FIG. 13 is a sequence diagram showing the flow of processing from the setting of multiplexing communication to cancellation of the multiplexing communication. First, as shown in FIG. 13, the wireless communication devices 10A and 10B exchange beacons based on the first TFC code in a beacon period to form a wireless network (steps S202 and S204). When the wireless communication device 10A is serving as a transmission source and receives transmission data (step S206), it transmits transmission data based on the first TFC code, and the wireless communication device 10B, which is serving as a receiving destination, receives the transmission data (step S208).

In this situation, if the amount of the transmission data stored in the transmission data storage portion 109 of the wireless communication device 10A increases (step S210), the multiplexing necessity determination portion 110 determines that multiplexing communication is necessary. In response to this, the wireless communication device 10A performs multiple setting of beacons (step S212). Then, based on both the first TFC code and the second TFC code, the wireless communication device 10A transmits beacons including the TFC multiplex information element in which the necessity of multiplex communication is described (step S214). Note that, for convenience of explanation, it is assumed that the beacon periods corresponding to the first TFC code and the second TFC code have the same timing. The wireless communication device 10A may determine in advance whether or not the wireless communication device 10B serving as the receiving destination is also capable of communication based on the second TFC code.

After that, the wireless communication device 10B transmits a beacon based on the first TFC code (step S216). Further, transmission data supply to the wireless communication device 10A continues (step S218), and the first wireless transmission portion 107 of the wireless communication device 10A transmits transmission data based on the first TFC code (step S220).

Following this, if the multiplexing necessity determination portion 110 of the wireless communication device 10B at the receiving destination detects a beacon which is addressed to the device itself and in which a multiplex transmission request is described, it determines that multiplexing is necessary, and performs the multiple setting of beacons (step S221).

Then, the wireless communication device 10A transmits beacons based on both the first TFC code and the second TFC code (step S224). The wireless communication device 10B also transmits beacons based on both the first TFC code and the second TFC code (step S226). Further, transmission data supply to the wireless communication device 10A continues (steps S222 and S228), and the wireless communication device 10A transmits transmission data based on both the first TFC code and the second TFC code (step S230). Here, the distributed processing portion 119 may distribute the transmission data stored in the transmission data storage portion 109 so that data transmission can be performed separately using the two TFC codes.

At this time, the wireless communication device 10B prepares to receive a plurality of TFC codes. When the wireless communication device 10B receives the first TFC code, it uses the second wireless receiving portion 117 that operates on the frequency hopping pattern defined by the second TFC code, in addition to the first wireless receiving portion 103 that operates on the frequency hopping pattern of the first TFC code. The aggregation processing portion 120 separately structures data from the respective data received by both the wireless receiving portions, and performs aggregation processing.

After that, transmission data supply to the wireless communication device 10A continues, and the wireless communication device 10A transmits beacons based on both the first TFC code and the second TFC code (step S234). The wireless communication device 10B also transmits beacons based on both the first TFC code and the second TFC code (step S236). For convenience of explanation, FIG. 13 shows an example in which the wireless communication device 10A continues multiplex communication while it continuously receives transmission data (step S238).

When the wireless communication device 10A has no transmission data (step S240), it stops the data transmission and beacon transmission based on the second TFC code (step S240), and provides notification to the communication counterpart that multiplex communication is cancelled, using the TFC multiplex information element (step S242). Then, after the wireless communication device 10B has transmitted beacons based on both the first TFC code and the second TFC code (step S244), it stops the data reception and beacon transmission based on the second TFC code (step S246). Thus, the wireless communication devices 10A and 10B return to a state where the wireless network is managed by exchanging beacons using the first TFC code, as in the initial operation (steps S248 and S250).

Figure 14:
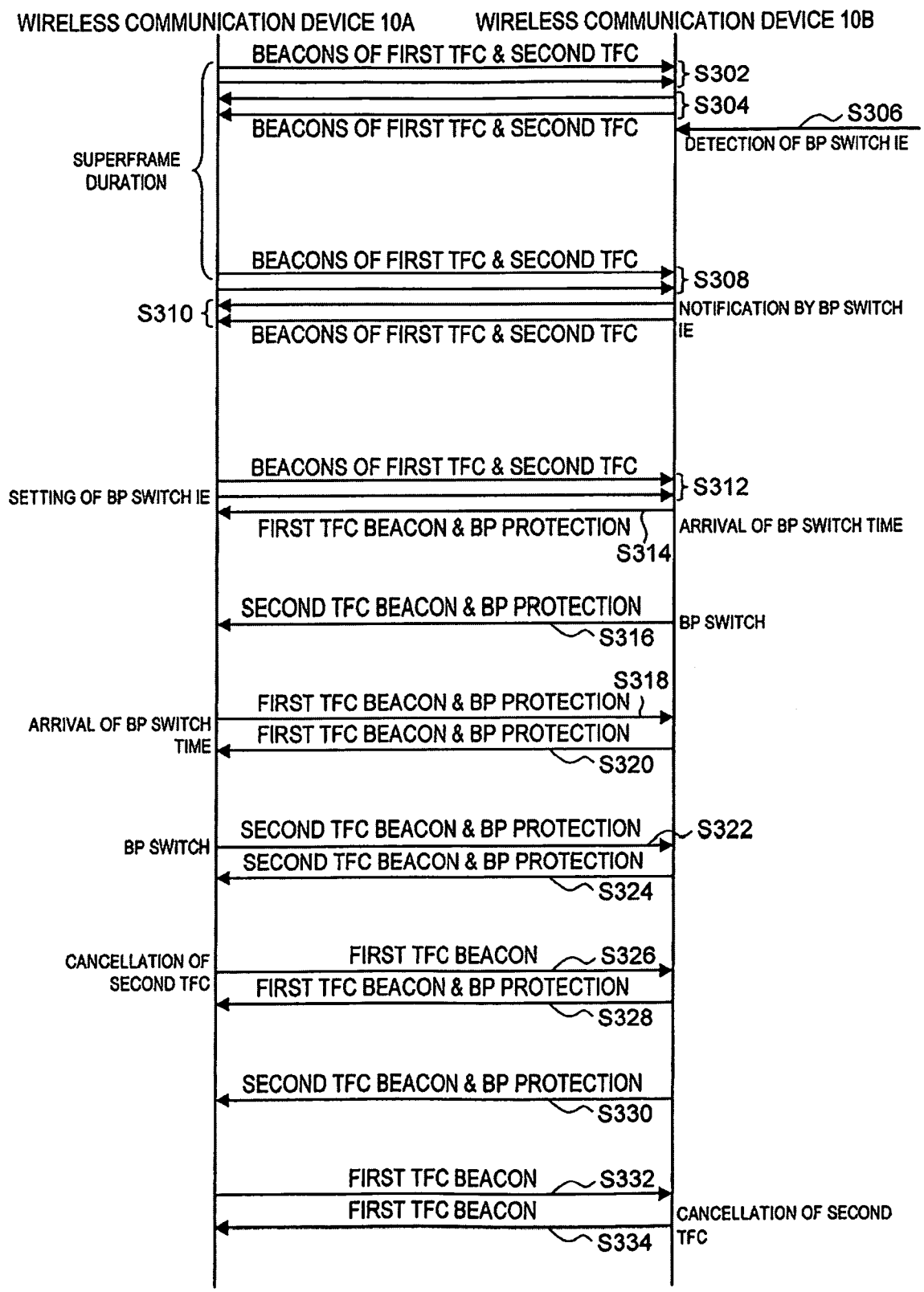
FIG. 14 is a sequence diagram showing the flow of processing of the setting and cancellation of beacon period protection.

FIG. 14 is a sequence diagram showing the flow of the setting and cancellation of beacon period protection. FIG. 14 shows a state where data communication based on the first TFC code and data communication based on the second TFC code are used simultaneously. However, in order to make the drawing clearer, description relating to the data communication is omitted.

First, as shown in FIG. 14, the wireless communication device 10A and the wireless communication device 10B transmit beacons based on the first TFC code and the second TFC code (steps S302 and S304). In this situation, it is assumed that the wireless communication device 10B detects a beacon period switch information element from a beacon based on the second TFC code that is received from another wireless communication device (step S306).

Then, after the wireless communication device 10B has received a beacon from the wireless communication device 10A in the next super frame duration (step S308), it transmits the beacon including the beacon period switch information element based on the second TFC code (step S310).

When the wireless communication device 10A detects the beacon period switch information element, the wireless communication device 10A also transmits a beacon including the beacon period switch information element based on the second TFC code in the next super frame duration (step S312). Further, when the time to switch the beacon period of the second TFC code arrives, the wireless communication device 10B transmits a beacon based on the second TFC code in a new beacon period that is different from the beacon period of the first TFC code (steps S314 and S316).

Note that the wireless communication device 10B sets, for the beacon that is transmitted based on the first TFC code at step S314, beacon period protection that protects the new beacon period of the second TFC code. Further, the wireless communication device 10B sets, for the beacon that is transmitted based on the second TFC code at step S316, beacon period protection that protects the beacon period of the first TFC code.

Similarly, when the time to switch the beacon period of the second TFC code arrives, the wireless communication device 10A transmits a beacon based on the second TFC code in a new beacon period that is different from the beacon period of the first TFC code (steps S318 to S324). Here, the wireless communication device 10A sets, for the beacon that is transmitted based on the first TFC code at step S318, beacon period protection that protects the new beacon period of the second TFC code. Further, the wireless communication device 10A sets, for the beacon that is transmitted based on the second TFC code at step S322, beacon period protection that protects the beacon period of the first TFC code.

When the wireless communication device 10A cancels the simultaneous use of the second TFC code, it transmits a beacon including the TFC multiplex information element that indicates cancellation of the simultaneous use of the second TFC code, using the first TFC code (step S326). Further, the wireless communication device 10A may cancel the beacon period protection corresponding to the second TFC code, using the beacon transmitted at step S326.

When the wireless communication device 10B receives the notification indicating the cancellation of the simultaneous use of the second TFC code, it transmits beacons based on the first TFC code and the second TFC code (steps S328 and S330). After that, the wireless communication device 10B cancels the simultaneous use of the second TFC code. Note that FIG. 14 shows an example in which one super frame is required until the wireless communication device 10B cancels the simultaneous use of the second TFC code. However, the beacon transmission at step S330 does not necessarily have to be performed.

Thereafter, the wireless communication device 10A and the wireless communication device 10B maintain the wireless network by operating only on the first TFC code (steps S332 and S334).

Figure 15:
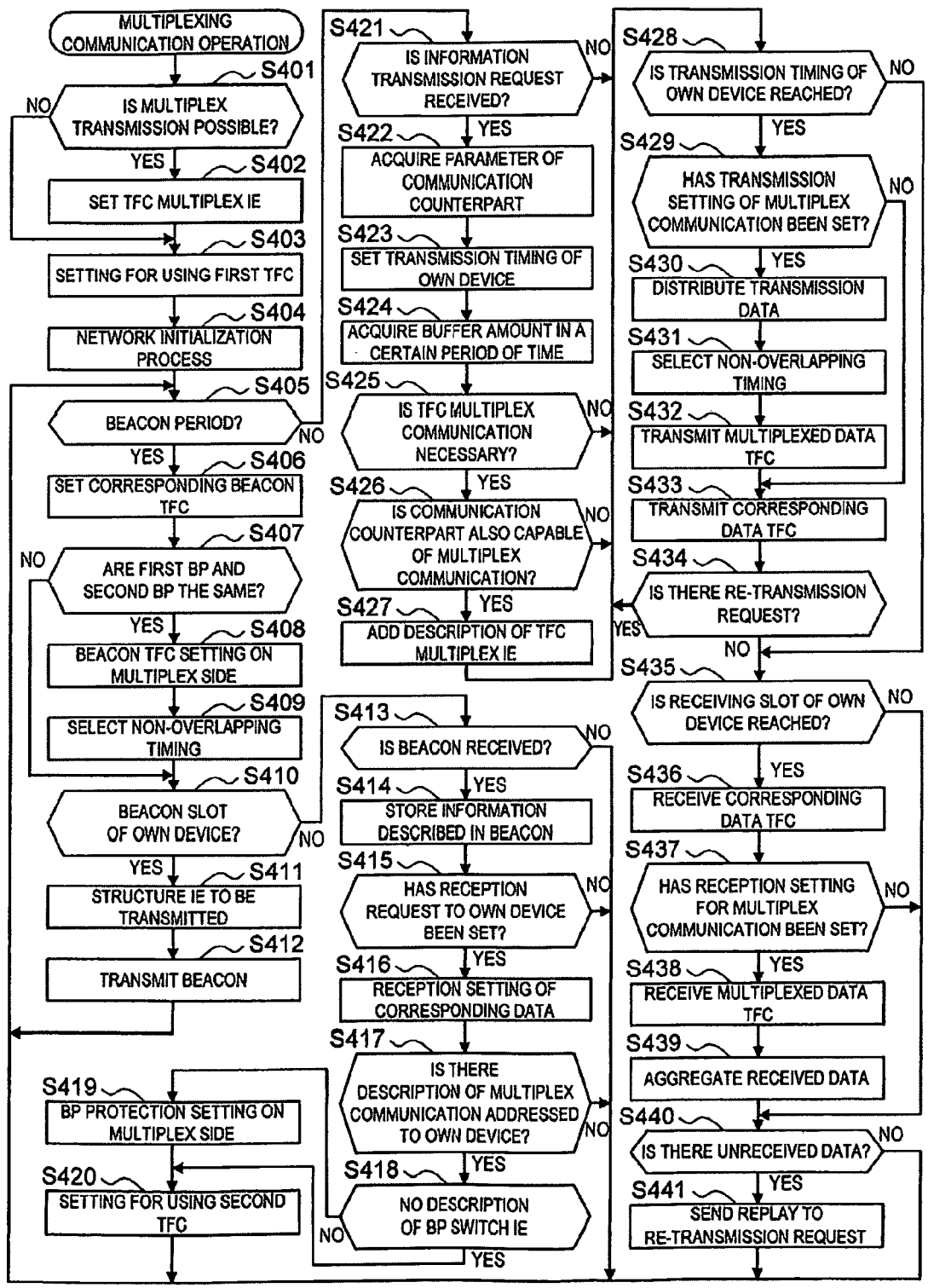
FIG. 15 is a flowchart showing the flow of a wireless communication method used by the wireless communication device according to the present embodiment.

FIG. 15 is a flowchart showing the flow of a wireless communication method used by the wireless communication device 10 according to the present embodiment. As shown in FIG. 15, if multiplex transmission is possible (step S401) after the power source is turned on, the wireless communication device 10 sets the TFC multiplex information element (step S402), and sets the use of the first TFC code (step S403) through a predetermined initialization scanning operation. Then, the wireless communication device 10 performs an initialization process of the wireless network using the first TFC code (step S404), and structures a wireless network with other wireless communication devices.

Following the initialization processing, if there is currently a beacon period (step S405), the wireless communication device 10 sets the TFC code to a TFC code of a corresponding beacon (step S406). If multiplexing communication is being performed and if the first and second beacon periods are set to have the same timing (step S407), the TFC code of the beacon to be used for multiplexing is also set (step S408). In addition, a multiplexing interval is selected in units of symbols so that the frequency hopping patterns of the sub bands used by both parties do not overlap (step S409).

Then, when the beacon slot of the device itself arrives (step S410), the wireless communication device 10 structures an information element and adds it to a beacon (step S411), and then transmits the beacon (step S412). Further, the wireless communication device 10 receives beacons during a time slot other than the beacon slot of the device itself. If the wireless communication device 10 receives a beacon (step S413), it acquires information described in the beacon and stores the information (step S414). Then, if a reception request to the device itself has been set (step S415), the wireless communication device 10 performs reception setting of the data (step S416).

When there is a description of a request for multiplex communication addressed to the device itself (step S417) and there is no description of the beacon period switch information element (BP Switch IE) (step S418), the process proceeds to step S420, and the wireless communication device 10 sets the use of the second TFC code. Meanwhile, when there is a description of the beacon period switch information element, the wireless communication device 10 also performs setting of beacon period protection corresponding to the second TFC code (step S419). Then, the process proceeds to step S420, and the wireless communication device 10 sets the use of the second TFC code.

When the wireless communication device 10 receives transmission data from the interface 108 (step S421), it stores the transmission data in the transmission data storage portion 109. Further, the wireless communication device 10 acquires a parameter described in the beacon at the receiving destination (step S422), and performs setting of transmission timing of the device itself (step S423). Further, the multiplexing necessity determination portion 110 of the wireless communication device 10 acquires, for example, a buffering amount of a certain period of time (step S424). If the multiplexing necessity determination portion 110 determines that multiplexing communication is necessary (step S425) and if the receiving destination device is also capable of multiplexing communication (step S426), the wireless communication device 10 describes a request for multiplexing communication in the TFC multiplex information element (step S427).

After that, when the transmission timing of the device itself arrives (step S428), if multiplexing communication has been set (step S429), the wireless communication device 10 performs distributed processing of the transmission data according to need (step S430). In addition, the wireless communication device 10 selects the multiplexing interval in units of symbols (step S431) so that the sub bands used by the TFC codes of both parties do not overlap each other, and performs data transmission using the second TFC code (step S432) and data transmission using the first TFC code, simultaneously (step S433). On the other hand, when multiplexing communication is not performed, the process proceeds to step S433, and the wireless communication device 10 transmits data only using the first TFC code (step S433).

When there is a re-transmission request from the receiving destination device (step S434), the process proceeds to step S428, and the wireless communication device 10 retransmits the specified unsent data. Meanwhile, when there is no re-transmission request, the wireless communication device 10 ends the transmission processing. When a receiving slot of the device itself arrives (step S435), the wireless communication device 10 performs reception setting for the first TFC code (step S436).

Further, if reception setting for multiplexing communication has been set (step S437), the wireless communication device 10 also performs reception setting for the second TFC code to be used for multiplexing (step S438). Then, the wireless communication device 10 aggregates the data received by the TFC codes of both parties (step S439). Further, when there is unreceived data (step S440), the wireless communication device 10 requests re-transmission of the unreceived data (step S441).

After the series of processes described above has been performed, the process returns to step S405 again, and the wireless network is managed by transmitting and receiving beacons in accordance with the arrival of beacon periods. During time periods other than beacon periods, processing for transmitting and receiving data is performed.

4. CONCLUSION

As described above, according to the present embodiment, the first wireless transmission portion 107 and the second wireless transmission portion 115 transmit radio signals in parallel. Accordingly, the wireless communication device 10 can obtain a larger transmission band than in the case of transmitting radio signals only from the first wireless transmission portion 107. Further, the multiplexing timing adjustment portion 114 adjusts the start timing of the frequency hopping pattern used by the second wireless transmission portion 115 such that used time slots of respective sub bands of the first wireless transmission portion 107 and the second wireless transmission portion 115 are not the same. Accordingly, it is possible to suppress interference between radio signals transmitted from the first wireless transmission portion 107 and the second wireless transmission portion 115. In summary, the wireless communication device 10 can increase the transmission bandwidth while suppressing interference between two types of radio signals.

Further, in the present embodiment, when different TFC codes are simultaneously used for communication, the first wireless receiving portion 103 that operates on the first TFC code and the second wireless receiving portion 117 that operates on the second TFC code are separately provided. Therefore, the first wireless receiving portion 103 and the second wireless receiving portion 117 can perform preamble decoding processing at the same time.

Further, the wireless communication device 10 of the present embodiment can share information relating to whether or not multiplexing communication is possible with a receiving destination device, by describing in a predetermined beacon that multiplexing communication is possible. In addition, the wireless communication device 10 can perform multiplexing communication with the receiving destination device, by providing notification that multiplexing communication is possible to the receiving destination device in advance.

In addition, if the wireless communication device 10 initially sets beacon periods of different TFC codes to be at the same position when performing multiplexing communication, it can structure an environment where synchronous communication can be performed easily.

Moreover, if a beacon period of one party is moved to a completely different position, the wireless communication device 10 protects a beacon period of the other party, thereby protecting the beacon period with a different TFC. Thus, a network can be maintained in a stable manner.

Furthermore, the wireless communication device 10 normally uses only one TFC code, and if transmission demand increases, it uses a plurality of TFC codes simultaneously. Therefore, high-speed wireless transmission can be achieved using the minimum possible increase in bandwidth. On the other hand, if there is no data to be transmitted in a certain period of time, the wireless communication device 10 cancels the setting for communication in which a plurality of TFC codes are used simultaneously. Therefore, unnecessary continuation of simultaneous use of TFC codes can be inhibited.

In addition, when performing multiplexing communication, the wireless communication device 10 distributes data to be transmitted using respective TFC codes, in sequence units. Therefore, the wireless communication device 10 does not perform unnecessary fragment processing, and can transmit data using a simple method. Further, when performing multiplexing communication, the wireless communication device 10 can easily restructure the data received using the respective TFC codes, in sequence units.

It should be understood by those skilled in the art that various modifications, combinations, sub-combinations and alterations may occur depending on design requirements and other factors insofar as they are within the scope of the appended claims or the equivalents thereof.

For example, each step of the processing performed by the wireless communication device 10 described in this specification does not have to be performed in time series in line with the order detailed in the flow chart or the sequence charts, and instead may include processing that is performed in parallel or individually (for example, parallel processing or object oriented processing).

Note that, a computer program can also be created that causes hardware such as a CPU, a ROM, and a RAM that are built-in to the wireless communication device 10 to perform functions that are the same as each structural element of the above-described wireless communication devices 10. A storage medium that stores the computer program is also provided. If each function block shown by the functional block diagram in FIG. 8 is structured by hardware, a series of processes can be realized by hardware.

What is claimed is:
1. A wireless communication device, comprising:
a first transmission portion that transmits a radio signal using a plurality of frequency bands in accordance with a first frequency hopping pattern;
a second transmission portion that transmits a radio signal using a plurality of frequency bands in accordance with a second frequency hopping pattern that differs from the first frequency hopping pattern;
a transmission buffer that temporarily stores transmission data to be transmitted from the first transmission portion as a radio signal;
a determination portion that causes also the second transmission portion to transmit a radio signal when a data amount of the transmission data stored in the transmission buffer exceeds a predetermined value; and
an adjustment portion that adjusts a start timing of the second frequency hopping pattern such that a time slot of each of the plurality of frequency bands used by the first transmission portion and a time slot of each of the plurality of frequency bands used by the second transmission portion are not the same.

2. The wireless communication device according to claim 1, wherein
the first transmission portion starts transmission of a radio signal in accordance with the first frequency hopping pattern after transmitting a first preamble,
the second transmission portion starts transmission of a radio signal in accordance with the second frequency hopping pattern after transmitting a second preamble, and
the adjustment portion performs adjustment such that the transmission of the second preamble from the second transmission portion is started after completion of the transmission of the first preamble from the first transmission portion.

3. The wireless communication device according to claim 1, wherein
the first transmission portion transmits a beacon in accordance with the first frequency hopping pattern in a first beacon period of a first wireless network that operates on the first frequency hopping pattern, and
the second transmission portion transmits a beacon in accordance with the second frequency hopping pattern in a second beacon period of a second wireless network that operates on the second frequency hopping pattern.

4. The wireless communication device according to claim 3, further comprising:
a first beacon generation portion that generates a beacon including information that inhibits transmission of a radio signal in the second beacon period; and
a second beacon generation portion that generates a beacon including information that inhibits transmission of a radio signal in the first beacon period, wherein
the first transmission portion transmits the beacon generated by the first beacon generation portion, and
the second transmission portion transmits the beacon generated by the second beacon generation portion.

5. The wireless communication device according to claim 4, wherein
the first beacon generation portion and the second beacon generation portion generate beacons including information that respectively indicates the first frequency hopping pattern and the second frequency hopping pattern.

6. The wireless communication device according to claim 1, wherein the determination portion stops the transmission of a radio signal from the second transmission portion when the data amount of the transmission data stored in the transmission buffer becomes equal to or less than the predetermined value.

7. The wireless communication device according to claim 1, further comprising:
an allocation portion that allocates the transmission data stored in the transmission buffer to the first transmission portion and the second transmission portion, wherein
when the transmission data transmitted as a radio signal from one of the first transmission portion and the second transmission portion is not received properly by a receiving destination device, the allocation portion allocates the transmission data to the other transmission portion for re-transmission.

8. The wireless communication device according to claim 1, wherein the first transmission portion and the second transmission portion transmit beacons at the same timing.

9. A wireless communication device comprising:
a first transmission portion that transmits a radio signal using a plurality of frequency bands in accordance with a first frequency hopping pattern;
a second transmission portion that transmits a radio signal using a plurality of frequency bands in accordance with a second frequency hopping pattern that differs from the first frequency hopping pattern;
an adjustment portion that adjusts a start timing of the second frequency hopping pattern such that a time slot of each of the plurality of frequency bands used by the first transmission portion and a time slot of each of the plurality of frequency bands used by the second transmission portion are not the same;
a storage portion that associates and records a combination of two or more of frequency hopping patterns and an adjustment amount; and
a setting portion that sets the combination of the frequency hopping patterns recorded in the storage portion as a combination of frequency hopping patterns used by the first transmission portion and the second transmission portion, wherein the adjustment portion adjusts the start timing of the second frequency hopping pattern based on the adjustment amount that is associated with the combination of the frequency hopping patterns and recorded in the storage portion.

10. A wireless communication system including a first wireless communication device and a second wireless communication device that is capable of communicating with the first wireless communication device, wherein
the first wireless communication device comprises:
a first transmission portion that transmits a radio signal using a plurality of frequency bands in accordance with a first frequency hopping pattern;
a second transmission portion that transmits a radio signal using a plurality of frequency bands in accordance with a second frequency hopping pattern that differs from the first frequency hopping pattern;
a transmission buffer that temporarily stores transmission data to be transmitted from the first transmission portion as a radio signal;
a determination portion that causes also the second transmission portion to transmit a radio signal when a data amount of the transmission data stored in the transmission buffer exceeds a predetermined value; and
an adjustment portion that adjusts a start timing of the second frequency hopping pattern such that a time slot of each of the plurality of frequency bands used by the first transmission portion and a time slot of each of the plurality of frequency bands used by the second transmission portion are not the same, and
the second wireless communication device comprises:
a first receiving portion that receives a radio signal that is transmitted using a plurality of frequency bands in accordance with the first frequency hopping pattern; and
a second receiving portion that receives a radio signal that is transmitted using a plurality of frequency bands in accordance with the second frequency hopping pattern.

11. A wireless communication method implemented by a wireless communication device, comprising the steps of:
transmitting a radio signal using a plurality of frequency bands in accordance with a first frequency hopping pattern;
transmitting a radio signal using a plurality of frequency bands in accordance with a second frequency hopping pattern that differs from the first frequency hopping pattern;
temporarily storing transmission data to be transmitted from the first transmission portion as a radio signal;
transmitting a radio signal when a data amount of the transmission data stored in the transmission buffer exceeds a predetermined value; and
adjusting a start timing of the second frequency hopping pattern such that a time slot of each of the plurality of frequency bands used by the first frequency hopping pattern and a time slot of each of the plurality of frequency bands used by the second frequency hopping pattern are not the same.

12. A wireless communication system including a first wireless communication device and a second wireless communication device that is capable of communicating with the first wireless communication device, wherein
the first wireless communication device comprises:
a first transmission portion that transmits a radio signal using a plurality of frequency bands in accordance with a first frequency hopping pattern;
a second transmission portion that transmits a radio signal using a plurality of frequency bands in accordance with a second frequency hopping pattern that differs from the first frequency hopping pattern;
a storage portion that associates and records a combination of two or more of frequency hopping patterns and an adjustment amount; and
a setting portion that sets the combination of the frequency hopping patterns recorded in the storage portion as a combination of frequency hopping patterns used by the first transmission portion and the second transmission portion, and
an adjustment portion that adjusts a start timing of the second frequency hopping pattern such that a time slot of each of the plurality of frequency bands used by the first transmission portion and a time slot of each of the plurality of frequency bands used by the second transmission portion are not the same, wherein the adjustment portion adjusts the start timing of the second frequency hopping pattern based on the adjustment amount that is associated with the combination of the frequency hopping patterns and recorded in the storage portion; and
the second wireless communication device comprises:
a first receiving portion that receives a radio signal that is transmitted using a plurality of frequency bands in accordance with the first frequency hopping pattern; and a second receiving portion that receives a radio signal that is transmitted using a plurality of frequency bands in accordance with the second frequency hopping pattern.

13. A wireless communication method implemented by a wireless communication device, comprising the steps of:

transmitting a radio signal using a plurality of frequency bands in accordance with a first frequency hopping pattern;

transmitting a radio signal using a plurality of frequency bands in accordance with a second frequency hopping pattern that differs from the first frequency hopping pattern;

associating and recording a combination of two or more of frequency hopping patterns and an adjustment amount;

setting the combination of the frequency hopping patterns recorded in the storage portion as a combination of frequency hopping patterns used by the first transmission portion and the second transmission portion; and adjusting a start timing of the second frequency hopping pattern such that a time slot of each of the plurality of frequency bands used by the first frequency hopping pattern and a time slot of each of the plurality of frequency bands used by the second frequency hopping pattern are not the same, wherein the adjustment portion adjusts the start timing of the second frequency hopping pattern based on the adjustment amount that is associated with the combination of the frequency hopping patterns and recorded in the storage portion.

* * * * *